United States Patent
Baba

(10) Patent No.: US 10,203,917 B2
(45) Date of Patent: Feb. 12, 2019

(54) MOBILE TERMINAL, METHOD FOR CONTROLLING MOBILE TERMINAL, PRINTING APPARATUS, AND STORAGE MEDIUM

(71) Applicant: CANON KABUSHIKI KAISHA, Tokyo (JP)

(72) Inventor: Tatsuru Baba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/645,680

(22) Filed: Mar. 12, 2015

(65) Prior Publication Data

US 2015/0268903 A1    Sep. 24, 2015

(30) Foreign Application Priority Data

Mar. 24, 2014    (JP) ................................ 2014-060798

(51) Int. Cl.
*G06F 3/12*      (2006.01)
*H04B 5/00*      (2006.01)
(Continued)

(52) U.S. Cl.
CPC .......... *G06F 3/1236* (2013.01); *G06F 3/1204* (2013.01); *G06F 3/1292* (2013.01);
(Continued)

(58) Field of Classification Search
CPC combination set(s) only.
See application file for complete search history.

(56) References Cited

U.S. PATENT DOCUMENTS 9,042,940 B2    5/2015    Suzuki et al.
2001/0042093 A1    11/2001    Shirai et al. .................. 709/201
(Continued)

FOREIGN PATENT DOCUMENTS

| JP | 2006-287788 A | 10/2006 |
| JP | 2009-033667 | 2/2009 |
| JP | 2013-214801 A | 10/2013 |

OTHER PUBLICATIONS

Japanese Office Action dated Jan. 29, 2018, in related Japanese Patent Application No. 2014-060798.
(Continued)

*Primary Examiner* — Helen Zong
(74) *Attorney, Agent, or Firm* — Venable LLP

(57) ABSTRACT

A mechanism that enables a device to autonomously control disconnection of communication is needed in situations where document data or photos of variable data size are transmitted and received wirelessly. In a wireless communication system, an image forming apparatus and a mobile terminal wirelessly communicate with each other. The image forming apparatus determines whether or not a predetermined condition is met, in a state where the wireless communication with the mobile terminal has been established. In the case of determining that the predetermined condition is met, the image forming apparatus breaks the wireless connection with the mobile terminal. The mobile terminal, upon detecting that the wireless communication has been disconnected, breaks the wireless connection with the image forming apparatus.

14 Claims, 17 Drawing Sheets

(51) Int. Cl.
*H04W 52/02* (2009.01)
*H04W 76/34* (2018.01)
*H04M 1/725* (2006.01)

(52) U.S. Cl.
CPC ........ *H04B 5/0031* (2013.01); *H04W 52/027* (2013.01); *H04W 76/34* (2018.02); *H04M 1/7253* (2013.01); *Y02D 10/1592* (2018.01); *Y02D 70/00* (2018.01); *Y02D 70/142* (2018.01); *Y02D 70/144* (2018.01); *Y02D 70/164* (2018.01); *Y02D 70/166* (2018.01)

(56) References Cited

U.S. PATENT DOCUMENTS

| | | | |
|---|---|---|---|
| 2013/0055001 A1* | 2/2013 | Jeong | G06F 1/3228 713/323 |
| 2013/0138797 A1 | 5/2013 | Locker et al. | |
| 2013/0260819 A1* | 10/2013 | Suzuki | H04W 88/06 455/552.1 |
| 2014/0355058 A1* | 12/2014 | Matsuhara | H04N 1/00381 358/1.15 |
| 2015/0098348 A1* | 4/2015 | Ogura | H04W 76/06 370/252 |
| 2015/0116753 A1* | 4/2015 | Sato | G06F 3/1238 358/1.14 |
| 2015/0312854 A1* | 10/2015 | Iwaki | H04W 52/0229 455/574 |
| 2016/0227071 A1* | 8/2016 | Asakura | H04N 1/32496 |
| 2016/0274841 A1* | 9/2016 | Suzuki | G06F 3/1238 |

OTHER PUBLICATIONS

Japanese Office Action dated Aug. 27, 2018, in related Japanese Patent Application No. 2014-060798.

\* cited by examiner

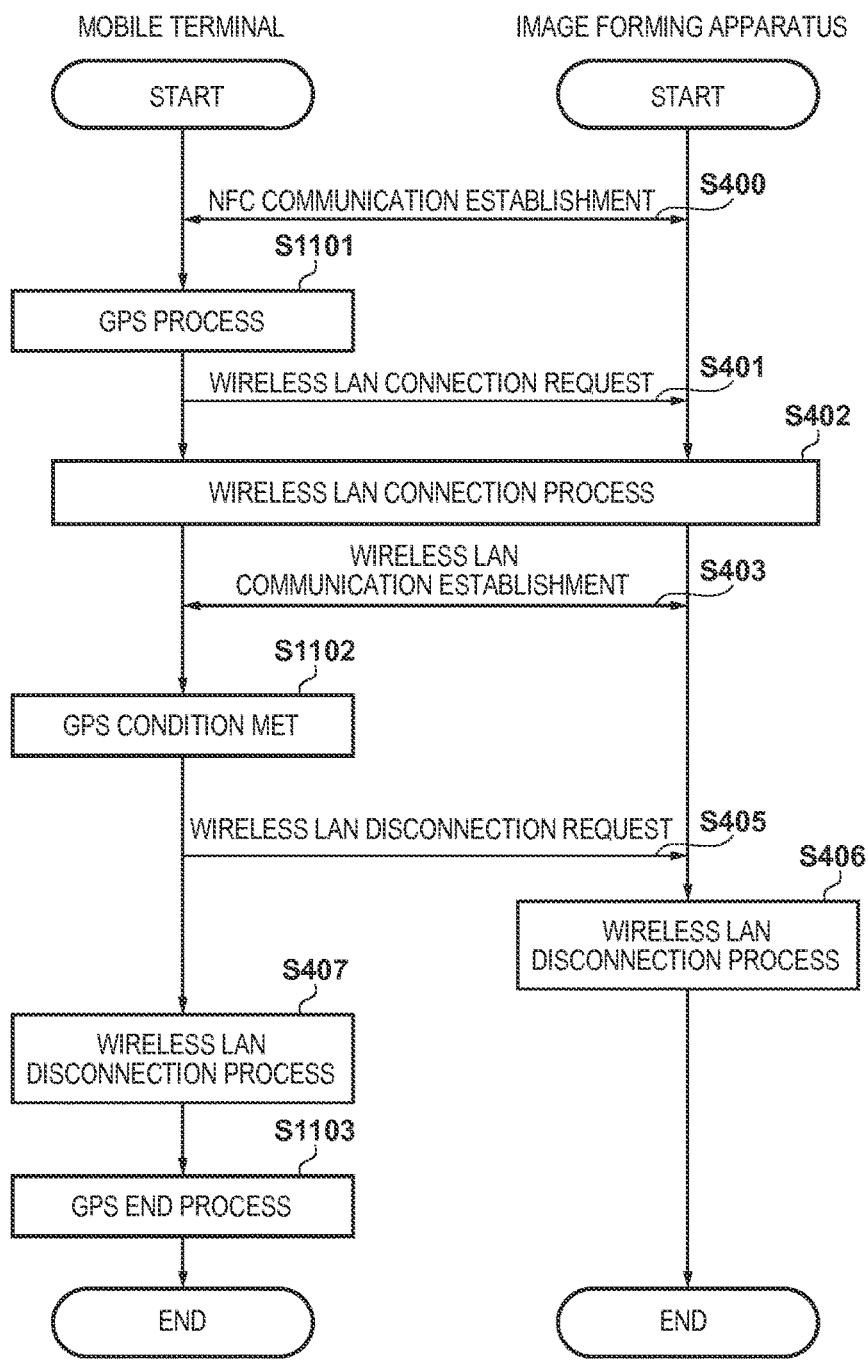

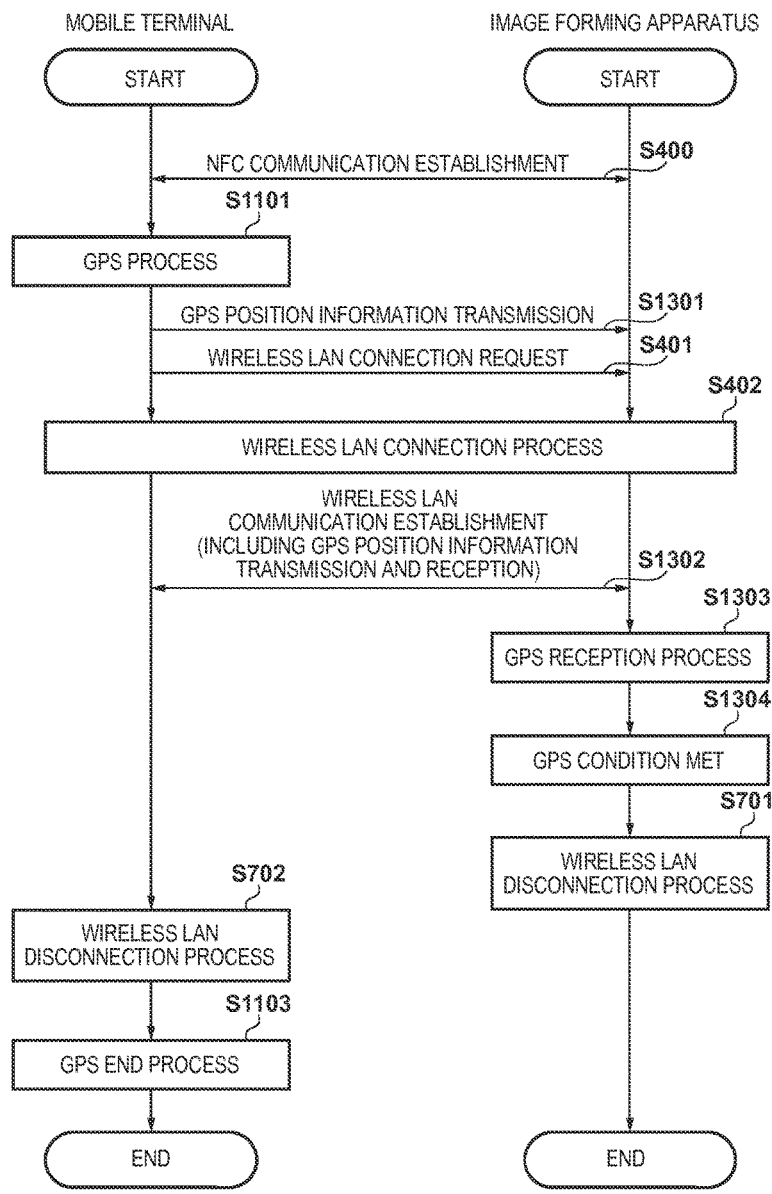

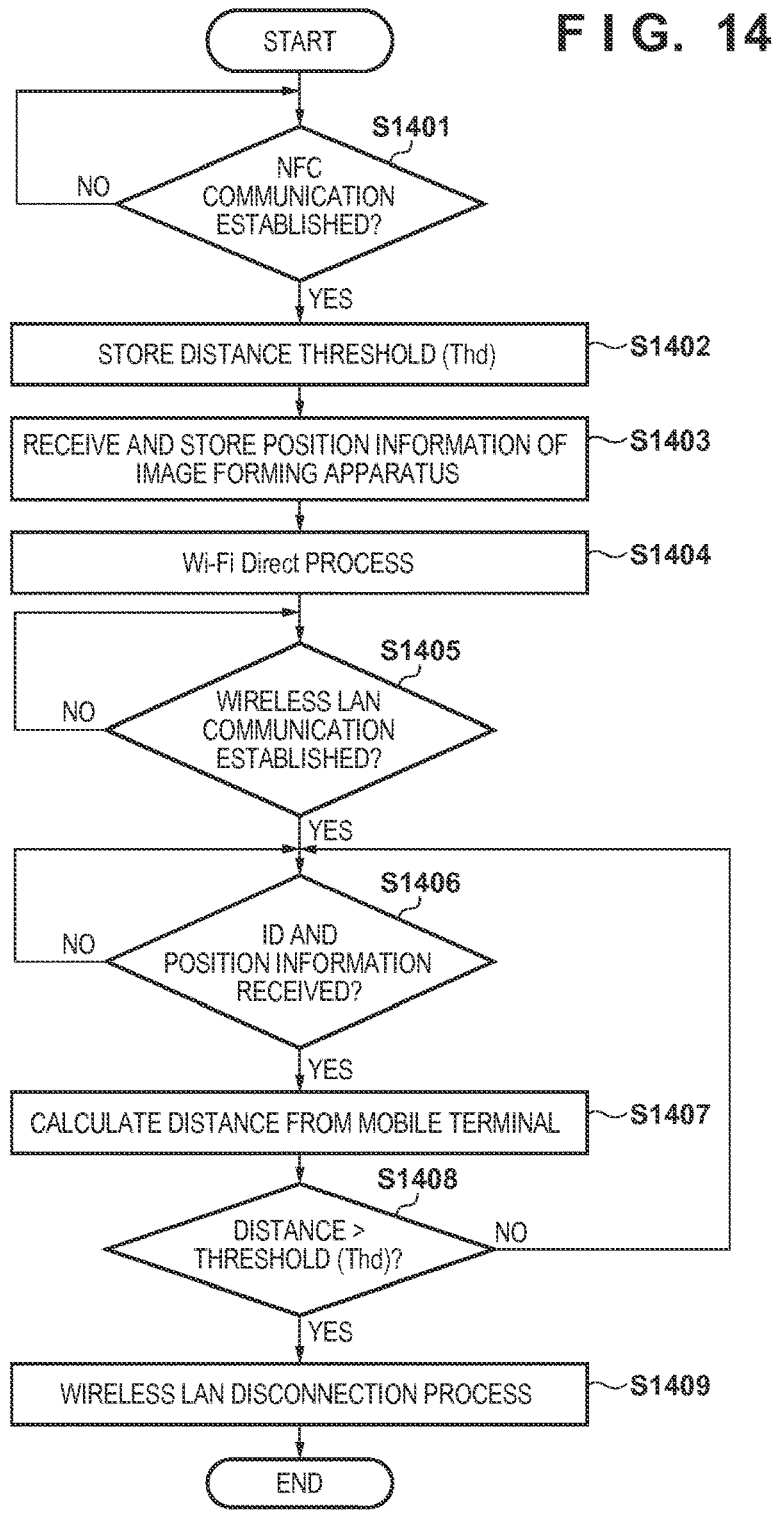

MOBILE TERMINAL, METHOD FOR CONTROLLING MOBILE TERMINAL, PRINTING APPARATUS, AND STORAGE MEDIUM

BACKGROUND OF THE INVENTION

Field of the Invention

The present invention relates to a mobile terminal, a method for controlling a mobile terminal, a printing apparatus, and a storage medium.

Description of the Related Art

Smartphones and tablet PCs form a large market in recent years. These mobile terminals typically communicate with personal computers, digital cameras, printers, and the like via wireless LANs, and devices equipped with wireless LAN communication function are used widely. As a simple method for establishing wireless LAN communication between such devices, Wi-Fi Direct has been developed by the Wi-Fi Alliance. Wi-Fi Direct defines three architectures. The first architecture is a one-to-one configuration in which two wireless LAN-equipped devices are connected one-to-one. The second architecture is a one-to-many configuration in which a plurality of wireless LAN-equipped devices are connected one-to-N. The third architecture is a concurrent Wi-Fi AP and peer-to-peer connection in which one wireless LAN-equipped device is connected to another wireless LAN-equipped device concurrently with an access point. Since the number of devices connectable by Wi-Fi Direct is limited in any of these architectures, it is desirable to disconnect unnecessary Wi-Fi Direct communication. Hence, a technique whereby a device autonomously disconnects wireless communication based on update information of data transmitted and received has been proposed (see Japanese Patent Laid-Open No. 2009-33667).

According to the invention disclosed in Japanese Patent Laid-Open No. 2009-33667, disconnection from a network is automatically performed after content is obtained via wireless communication. However, such a technique is not applicable to, for example, a situation where document data or photos of variable data size are received via wireless communication and printed, or data communication that is performed a different number of times depending on circumstances. There is accordingly the need for a mechanism that enables a device to autonomously control disconnection of communication even in these situations.

SUMMARY OF THE INVENTION

The present invention has a feature of providing a technique for appropriately disconnecting wireless communication.

According to one aspect of the present invention, there is provided a mobile terminal capable of communicating with a printing apparatus, the mobile terminal comprising: a short-range wireless communication unit configured to perform short-range wireless communication; a wireless communication unit configured to establish wireless communication with the printing apparatus based on the short-range wireless communication, the wireless communication being different from the short-range wireless communication; and a disconnection unit configured to disconnect the wireless communication established with the printing apparatus, in a case where the mobile terminal shifts to a power saving state.

According to another aspect of the present invention, there is provided a mobile terminal capable of communicating with a printing apparatus, the mobile terminal comprising: a short-range wireless communication unit configured to perform short-range wireless communication; a wireless communication unit configured to establish wireless communication with the printing apparatus based on the short-range wireless communication, the wireless communication being different from the short-range wireless communication; an identifying unit configured to identify a distance between the mobile terminal and the printing apparatus; and a disconnection unit configured to disconnect the wireless communication established with the printing apparatus, in a case where the distance identified by the identifying unit meets a predetermined condition.

According to still another aspect of the present invention, there is provided a printing apparatus capable of communicating with a mobile terminal, the printing apparatus comprising: a wireless communication unit configured to establish wireless communication with the mobile terminal; an obtainment unit configured to obtain, from the mobile terminal, position information indicating a position of the mobile terminal and identified by the mobile terminal; an identifying unit configured to identify a distance between the mobile terminal and the printing apparatus, based on the position information obtained by the obtainment unit; and a disconnection unit configured to disconnect the wireless communication established with the mobile terminal, in a case where the distance identified by the identifying unit meets a predetermined condition.

According to yet another aspect of the present invention, there is provided a method for controlling a mobile terminal capable of performing short-range wireless communication with a printing apparatus, the method comprising: controlling the mobile terminal to establish wireless communication with the printing apparatus based on the short-range wireless communication, the wireless communication being different from the short-range wireless communication; and controlling the mobile terminal to disconnect the established wireless communication, in a case where the mobile terminal shifts to a power saving state.

According to still yet another aspect of the present invention, there is provided a method for controlling a mobile terminal capable of performing short-range wireless communication with a printing apparatus, the method comprising: controlling the mobile terminal to establish wireless communication with the printing apparatus based on the short-range wireless communication, the wireless communication being different from the short-range wireless communication; identifying a distance between the mobile terminal and the printing apparatus; and controlling the mobile terminal to disconnect the wireless communication established with the printing apparatus, in a case where the identified distance meets a predetermined condition.

According to the present invention, wireless communication can be disconnected appropriately.

Further features of the present invention will become apparent from the following description of exemplary embodiments (with reference to the attached drawings).

BRIEF DESCRIPTION OF THE DRAWINGS

FIG. 11 is a sequence diagram describing a cooperative operation between an image forming apparatus and the mobile terminal according to the third embodiment of the present invention.

FIG. 13 is a sequence diagram describing a cooperative operation between an image forming apparatus and a mobile terminal according to a fourth embodiment of the present invention.

FIG. 14 is a flowchart describing a wireless LAN disconnection process by the image forming apparatus according to the fourth embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1:
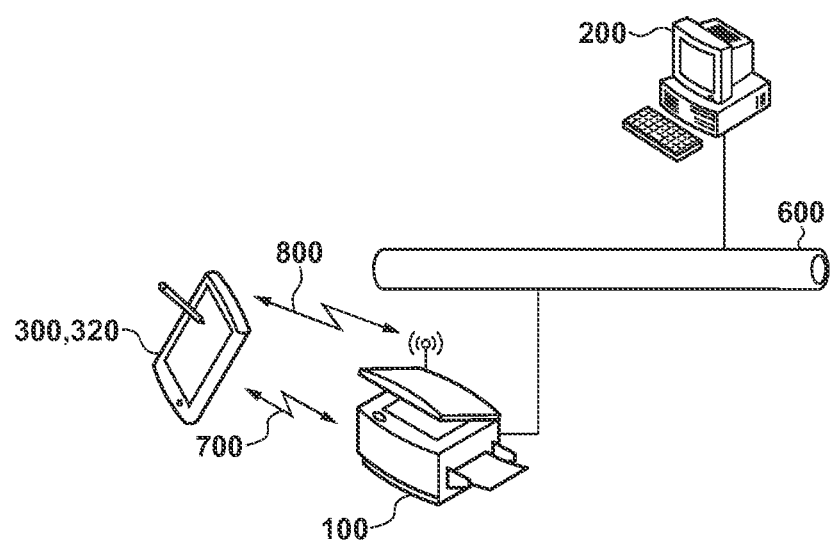
FIG. 1 is a diagram showing the structure of a wireless communication system according to an embodiment of the present invention.

FIG. 1 is a diagram showing the structure of a wireless communication system according to an embodiment of the present invention.

The wireless communication system includes an image forming apparatus 100, a personal computer (PC) 200, a mobile terminal 300 or 320, and a local area network (LAN) 600. The image forming apparatus 100 is a multifunction peripheral (MFP) having copy function, print function, and scan function. The image forming apparatus 100 includes an interface for NFC communication 700, an interface for wireless LAN communication 800, and an interface for LAN communication, as communication interfaces with external devices. The image forming apparatus 100 according to this embodiment supports the IEEE 802.11 series in the wireless LAN communication 800. However, this is not a limitation, and wireless communication such as Bluetooth® may be used. The PC 200 can transmit print jobs to the image forming apparatus 100, and receive data computerized by the image forming apparatus 100 from the image forming apparatus 100 and reference the data. The PC 200 includes a wired LAN communication interface connected to the local area network 600. The mobile terminal 300 or 320 is a portable information processing terminal including an interface for the NFC communication 700, an interface for the wireless LAN communication 800, and the like, and is a smartphone, a tablet PC, or the like. The mobile terminal 300 or 320 is capable of communicating with the image forming apparatus 100 via the NFC communication 700. Information transmitted and received here includes an IP address and the like. The mobile terminal 300 or 320 can also transmit image data stored in the mobile terminal 300 or 320 to the image forming apparatus 100 via the wireless LAN communication 800, to print the image data. The local area network 600 is a network connection realized by Ethernet® or the like. The image forming apparatus 100 and the PC 200 are connected via the local area network 600, and transmit and receive various data.

Figure 2:
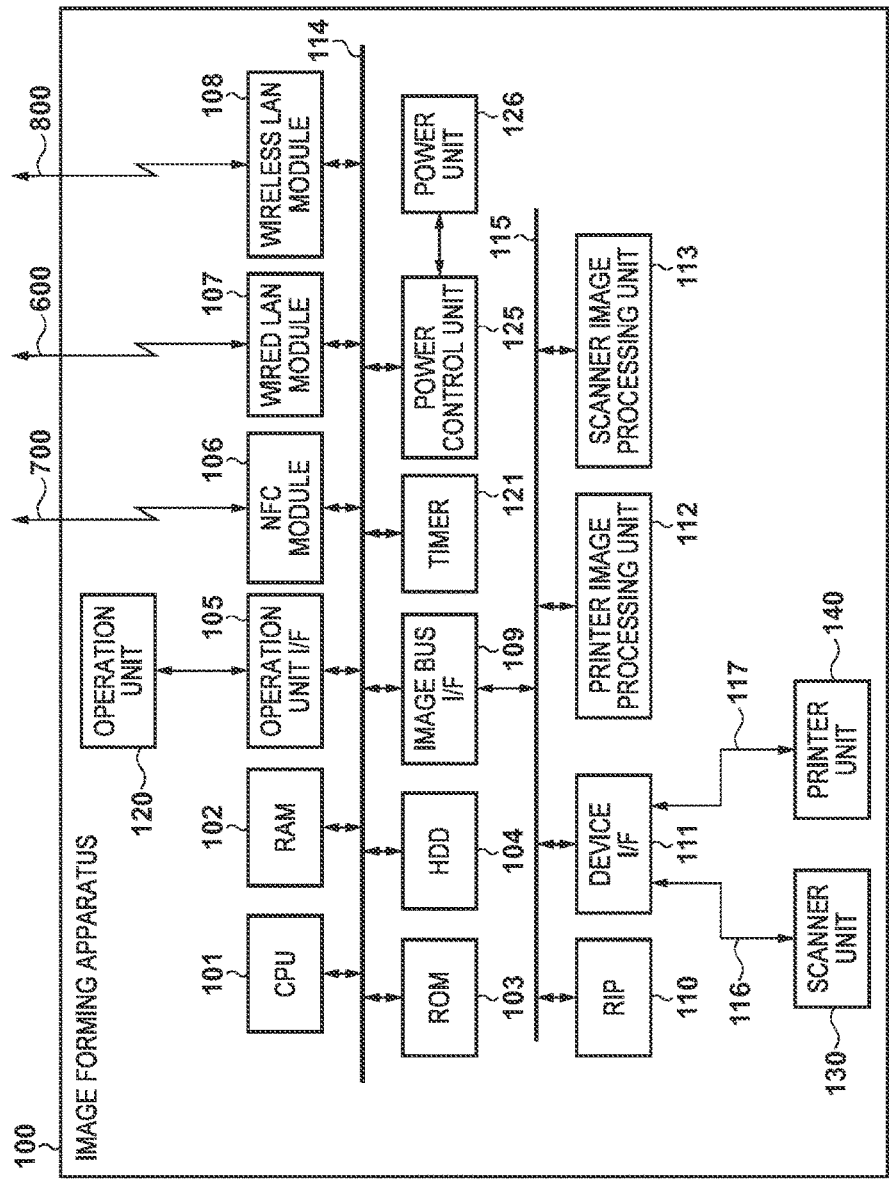
FIG. 2 is a block diagram showing the structure of an image forming apparatus according to the embodiment of the present invention.

FIG. 2 is a block diagram showing the structure of the image forming apparatus 100 according to the embodiment of the present invention.

A CPU 101 is a central processing unit that controls the whole image forming apparatus 100. A RAM 102 is a memory for storing a program executed by the CPU 101, and also provides a work memory for temporarily storing data used for operation by the CPU 101. A ROM 103 stores a boot program used to start the image forming apparatus 100. An HDD 104 is a hard disk drive (HDD) for storing software and various settings relating to the control of the image forming apparatus 100, saved document data, and the like. When the image forming apparatus 100 is powered on, the CPU 101 executes the boot program in the ROM 103, and expands an OS, an application program, etc. installed in the HDD 104 onto the RAM 102 and executes it. An operation unit 120 provides a user interface with which the user controls the image forming apparatus 100, and performs information input and output between the image forming apparatus 100 and the user. The operation unit 120 includes a display unit (not shown), a touch panel (not shown), and hardware keys (not shown). The user can select a button displayed by the display unit, by touching the button on the screen being displayed. An operation unit I/F 105 is an interface of the operation unit 120, and relays input and output data of the operation unit 120. The CPU 101 receives, via the operation unit I/F 105, key information and coordinate information on the touch panel selected by the user, and controls the operation of the image forming apparatus 100 based on these information. A near field communication (NFC) module 106 transmits and receives data via the NFC communication (short-range communication) 700. The NFC module 106 includes an antenna (not shown) for transmitting and receiving radio waves for the NFC communication 700, and a flash ROM (not shown) used to temporarily hold data handled in the NFC communication 700. A wired LAN module 107 performs control for data transmission and reception with external devices via the local area network 600. A wireless LAN module 108 transmits and receives data via the wireless LAN communication 800. The wireless LAN module 108 includes an antenna (not shown) for transmitting and receiving radio waves for the wireless LAN communication 800. A timer 121 is realized by, for example, a 32-bit counter that can be subjected to control such as clear, start counting time, stop counting time, check the current count time, etc., according to instructions of a program executed by the CPU 101.

A power control unit 125 controls the power of the image forming apparatus 100, and powers on or off the apparatus when instructed by the CPU 101 or when the user operates a power switch (not shown). When the CPU 101 detects a state in which no operation has been received from the user for a predetermined time or a state in which no print job has been received via the local area network 600 for a predetermined time, the CPU 101 causes the power control unit 125 to stop power supply to unnecessary parts. The power control unit 125 can also detect a power off operation using the power switch (not shown), and notify the CPU 101 of the detection result as a power off request. Upon receiving the power off request, the CPU 101 shifts the image forming apparatus 100 to a state in which the image forming apparatus 100 can be powered off, and instructs the power control unit 125 to stop the power. A power unit 126 converts AC power which is utility power to DC power and supplies the DC power to the power control unit 125. The power unit 126 can turn on or off the supply when instructed by the power control unit 125. The CPU 101, the RAM 102, the ROM 103, the HDD 104, the operation unit I/F 105, the modules 106 to 108, the power control unit 125, the timer 121, etc. are connected to each other via a system bus 114.

An image bus I/F 109 performs relay and data structure conversion between the system bus 114 and an image bus 115 for connecting blocks related to image processing. An RIP 110, a device I/F 111, a printer image processing unit 112, and a scanner image processing unit 113 are connected to the image bus 115. The RIP 110 is a raster image processor (RIP), and converts page description language (PDL) codes or display lists to bitmap images. The device I/F 111 is an interface for connecting a scanner unit 130 and a printer unit 140 to the image bus 115, and is connected to the scanner unit 130 via a scanner bus 116 and the printer unit 140 via a printer bus 117. The device I/F 111 adjusts the timing of transmitting image data received from the scanner unit 130 via the scanner bus 116 to the image bus 115. The device I/F 111 also adjusts the timing of transmitting image data from the image bus 115 to the printer unit 140 via the printer bus 117. The scanner image processing unit 113 performs processes such as correction and resolution conversion corresponding to the image forming apparatus 100, on image data generated by the scanner unit 130. The printer image processing unit 112 performs processes such as correction and resolution conversion corresponding to the printer unit 140, on image data to be printed.

Figure 3:
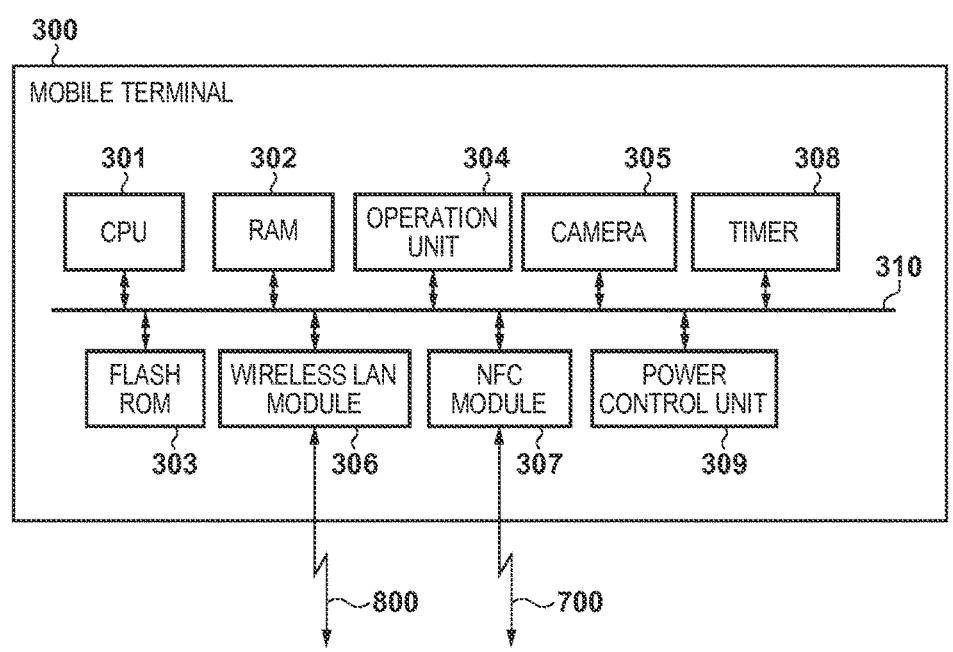
FIG. 3 is a block diagram showing the structure of a mobile terminal according to the embodiment of the present invention.

FIG. 3 is a block diagram showing the structure of the mobile terminal 300 according to the embodiment of the present invention. The mobile terminal 320 has the same structure as the mobile terminal 300.

A CPU 301 is a central processing unit that controls the whole mobile terminal 300. A RAM 302 is a memory for storing a program executed by the CPU 301, and is also used as a work memory for temporarily storing data used for operation by the CPU 301. A flash ROM 303 stores a program and various data used by the CPU 301. The CPU 301 expands the program stored in the flash ROM 303 onto the RAM 302 and executes it. An operation unit 304 performs information input and output between the user and the mobile terminal 300, and includes a display unit (not shown) and a touch panel (not shown). A camera 305 is used to capture still and moving images. A wireless LAN module 306 transmits and receives data via the wireless LAN. The wireless LAN module 306 includes an antenna (not shown) for transmitting and receiving radio waves for the wireless LAN communication 800. An NFC module 307 transmits and receives data via the NFC communication 700. The NFC module 307 includes an antenna (not shown) for transmitting and receiving radio waves for the NFC communication 700, and a flash ROM (not shown) used to temporarily hold data handled in the NFC communication 700. A timer 308 is realized by, for example, a 32-bit counter that can be subjected to control such as clear, start counting time, stop counting time, check the current count time, etc., according to instructions of a program executed by the CPU 301. A power control unit 309 supplies power to the mobile terminal 300, and includes a battery. The CPU 301, the RAM 302, the operation unit 304, the camera 305, the wireless LAN module 306, the NFC module 307, and the timer 308 have power saving operation mode, and can reduce the power consumption of each unit in cooperation with the power control unit 309 according to an instruction by the CPU 301. The CPU 301, the RAM 302, the flash ROM 303, the operation unit 304, the camera 305, the wireless LAN module 306, the NFC module 307, the timer 308, the power control unit 309, etc. are connected via a system bus 310, and perform data transmission and reception with each other.

First Embodiment

Figure 4:
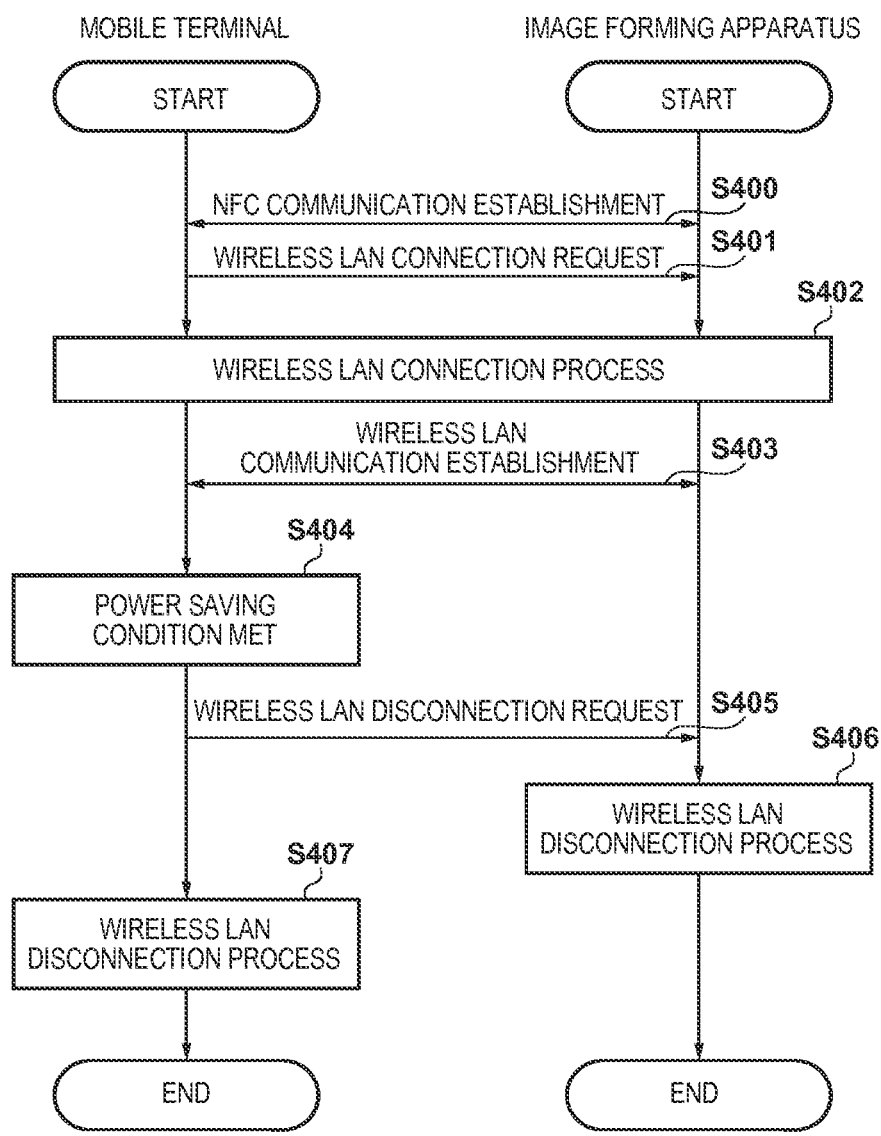
FIG. 4 is a sequence diagram describing a cooperative operation between an image forming apparatus and a mobile terminal according to a first embodiment of the present invention.

FIG. 4 is a sequence diagram describing a cooperative operation between the image forming apparatus 100 and the mobile terminal 300 according to a first embodiment of the present invention.

First, in step S400, the image forming apparatus 100 and the mobile terminal 300 establish the NFC communication 700. Next, in step S401, the mobile terminal 300 transmits a connection request for the wireless LAN communication 800 to the image forming apparatus 100 via the NFC communication 700. In step S402, the mobile terminal 300 starts the wireless LAN connection process. Meanwhile, the image forming apparatus 100 receives the wireless LAN connection request from the mobile terminal 300 in step S401, and starts the wireless LAN connection process in step S402. Thus, the image forming apparatus 100 and the mobile terminal 300 execute the wireless LAN connection process with each other in step S402, and as a result establish the wireless LAN communication 800 in step S403.

In the first embodiment, the connection of the wireless LAN communication 800 between the image forming apparatus 100 and the mobile terminal 300 is performed based on the connection request from the mobile terminal 300. However, the present invention is not limited to this, and the connection may be performed based on the connection request from the image forming apparatus 100. Alternatively, the connection of the wireless LAN communication 800 may be performed after each of the image forming apparatus 100 and the mobile terminal 300 is operated to select a connection execution menu for the wireless LAN communication 800. Although the wireless LAN communication 800 in the first embodiment is connected by Wi-Fi Direct, the connection may instead be Bluetooth® or the like. The image forming apparatus 100 and the mobile terminal 300 then perform transmission and reception of a print job or the like via the wireless LAN communication 800.

In step S404, in the case where a condition, e.g. no user operation has been detected for a predetermined time, is met, the mobile terminal 300 shifts to a power saving state. In step S405, the mobile terminal 300 requests the image forming apparatus 100 to disconnect the wireless LAN communication 800, via the wireless LAN communication 800. In step S406, the image forming apparatus 100 executes a process of disconnecting the wireless LAN communication 800, in response to the disconnection request for the wireless LAN communication 800 from the mobile terminal 300. In step S407, upon detecting the disconnection of the wireless LAN communication 800, the mobile terminal 300 executes a process of disconnecting the wireless LAN communication 800.

Figure 5:
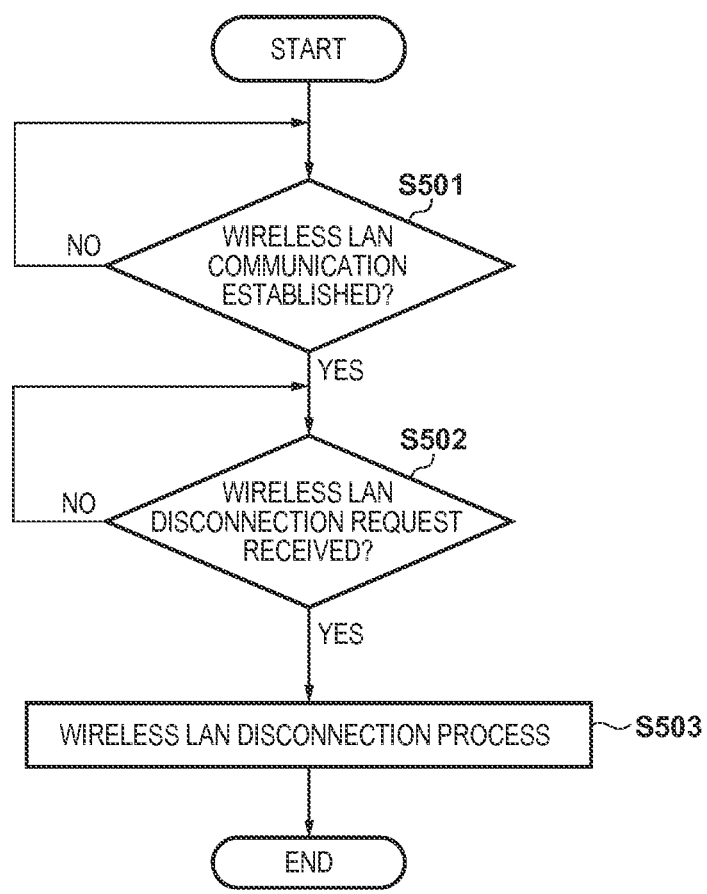
FIG. 5 is a flowchart describing a wireless LAN disconnection process by the image forming apparatus according to the first embodiment of the present invention.

FIG. 5 is a flowchart describing the wireless LAN disconnection process by the image forming apparatus 100 according to the first embodiment of the present invention. This process is executed by the CPU 101 based on the program expanded onto the RAM 102 as a result of the CPU 101 executing the boot program stored in the ROM 103 after the image forming apparatus 100 is powered on.

First, in step S501, the CPU 101 determines whether or not the wireless LAN communication 800 has been established, by referencing the value of a register (not shown) indicating the state of the wireless LAN module 108 via the system bus 114. In the case where the CPU 101 determines in step S501 that the wireless LAN module 108 has not established the communication, the CPU 101 waits in step S501 until the wireless LAN communication 800 is established. In the case where the CPU 101 determines in step S501 that the wireless LAN communication 800 has been established, the CPU 101 advances to step S502, and determines whether or not a wireless LAN disconnection request from the mobile terminal 300 has been received. In the case where the CPU 101 determines that the wireless LAN disconnection request from the mobile terminal 300 has not been received, the CPU 101 waits in step S502. In the case where the CPU 101 determines that the wireless LAN disconnection request from the mobile terminal 300 has been received, the CPU 101 advances to step S503. In step S503, the CPU 101 executes the process of disconnecting the established wireless LAN communication 800.

The image forming apparatus 100 according to the first embodiment is based on the use of Wi-Fi Direct that enables connection with a plurality of mobile terminals 300. Accordingly, as the wireless LAN disconnection process, the CPU 101 executes the process of disconnecting only the wireless LAN communication 800 corresponding to the request. In the case where Wi-Fi Direct that enables connection with one mobile terminal 300 is used, on the other hand, the process of disconnecting the wireless LAN communication 800 may be performed by stopping the transmission of communication radio waves and initializing the wireless LAN module 108.

Moreover, the image forming apparatus 100 according to the first embodiment is based on an example where the core network of the office is connected to the wired LAN module 107 and the local mobile terminal is connected to the wireless LAN module 108. However, the wireless LAN module 108 may be connected to a wireless LAN access point (not shown) connected to the core network of the office. In this case, when executing Wi-Fi Direct, the communication destination of the wireless LAN communication 800 is switched from the wireless LAN access point (not shown) to the mobile terminal 300. After the Wi-Fi Direct communication is disconnected, the communication destination of the wireless LAN communication 800 may be switched back to the wireless LAN access point (not shown). There is also a possibility that only one line of network protocol stack is implemented in the image forming apparatus 100. In such a case, normally, the wired LAN module 107 or the wireless LAN module 108 is connected to the core network of the office. When executing Wi-Fi Direct, the communication with the core network is disconnected, and the wireless LAN communication 800 with the mobile terminal 300 is established via the wireless LAN module 108. After the Wi-Fi Direct communication is disconnected, control may be switched to the immediately previous communication state (the communication by the wired LAN module 107 or the wireless LAN module 108).

Figure 6:
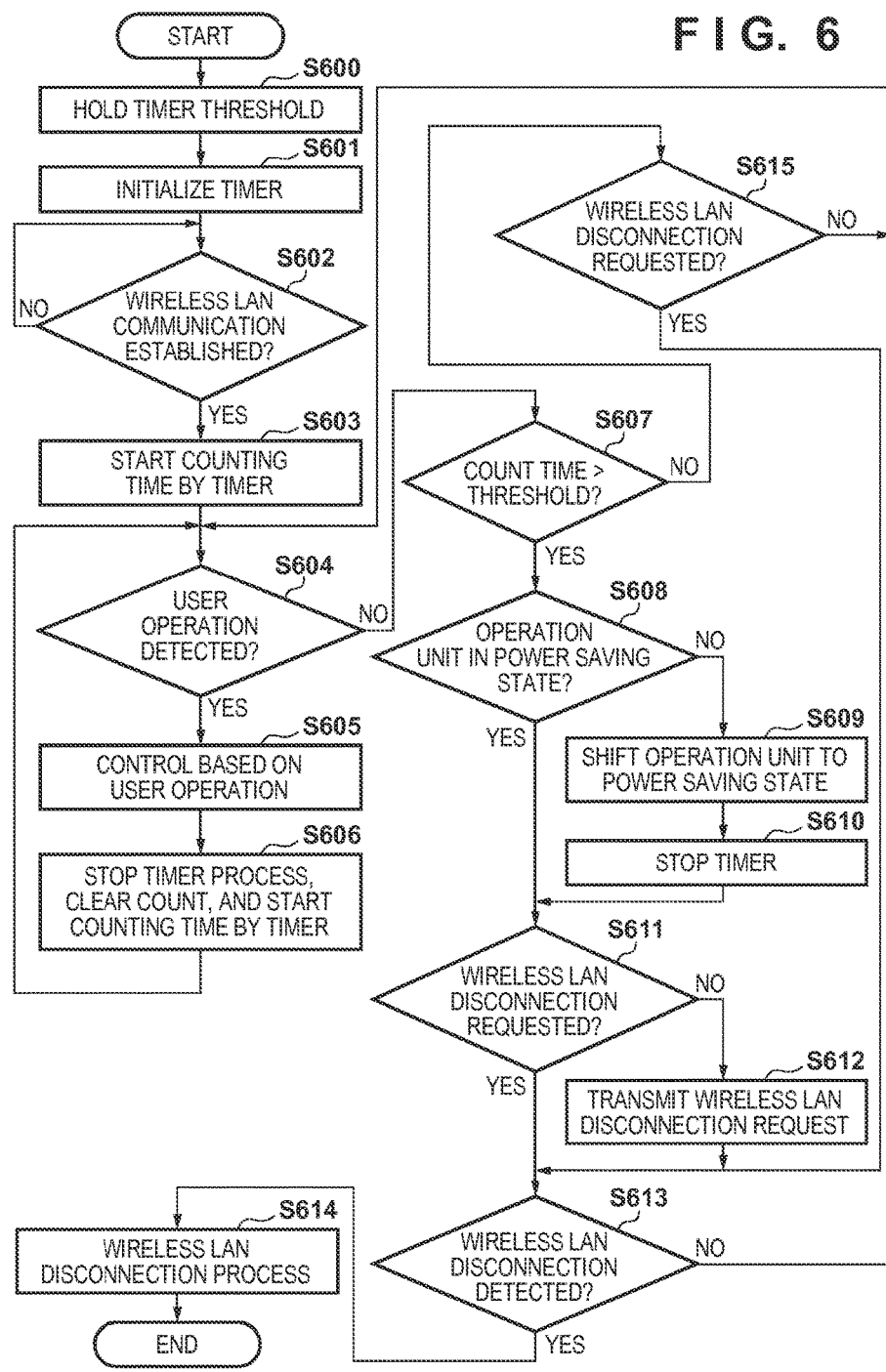
FIG. 6 is a flowchart describing a wireless LAN disconnection process by the mobile terminal according to the first embodiment of the present invention.

FIG. 6 is a flowchart describing the wireless LAN disconnection process by the mobile terminal 300 according to the first embodiment of the present invention. The process shown in this flowchart is realized by the CPU 301 executing the program expanded from the flash ROM 303 onto the RAM 302 after the mobile terminal 300 is powered on.

First, in step S600, the CPU 301 reads a predetermined threshold from the flash ROM 303, and holds the threshold in the RAM 302 as a threshold of the timer 308 for detecting the condition for shifting the mobile terminal 300 to the power saving state. Although this threshold is a fixed value in the mobile terminal 300 according to the first embodiment, the threshold may be a programmable value. Next, in step S601, the CPU 301 clears the current count time of the timer 308 via the system bus 310. Next, in step S602, the CPU 301 determines whether or not the wireless LAN communication 800 has been established, by referencing the value of a register (not shown) indicating the state of the wireless LAN module 306 via the system bus 310. In the case where the CPU 301 determines that the wireless LAN module 306 has not established the communication, the CPU 301 waits in step S602 until the wireless LAN communication 800 is established. In the case where the CPU 301 determines that the wireless LAN communication 800 has been established, the CPU 301 advances to step S603, and instructs the timer 308 to start counting time via the system bus 310.

Next, in step S604, the CPU 301 determines whether or not the user has operated the mobile terminal 300 via the operation unit 304. In the case where the CPU 301 detects the operation by the user, the CPU 301 advances to step S605, and controls the mobile terminal 300 according to the user operation. Next, in step S606, the CPU 301 instructs the timer 308 to stop counting time, clear the current count time, and start counting time via the system bus 310. Following this, in step S604, the CPU 301 performs the user operation detection process again. Thus, each time the user operation is detected, the CPU 301 executes the operation according to the user operation, and instructs the timer 308 to clear the count time and start counting time for determining whether or not to shift to the power saving mode.

In the case where the CPU 301 does not detect the user operation in step S604, the CPU 301 advances to step S607. In step S607, the CPU 301 reads the count time of the timer 308 via the system bus 310, and compares the count time with the threshold stored in the RAM 302 in step S600. In the case where the CPU 301 determines in step S607 that the count time of the timer 308 exceeds the threshold, the CPU 301 advances to step S608 because the condition for shifting to the power saving mode is met. In step S608, the CPU 301 determines whether or not the operation unit 304 is in the power saving state, by referencing the value of a register (not shown) indicating the state of the operation unit 304 via the system bus 310. This is intended to determine whether or not the shift to the power saving state has been already made. In the case where the CPU 301 determines in step S608 that the operation unit 304 is not in the power saving state, the CPU 301 advances to step S609. In step S609, the CPU 301 sets a register (not shown) for power saving control of the operation unit 304 to shift to the power saving state via the system bus 310, thus shifting the operation unit 304 to the power saving state. In this way, when the state in which the user does not operate the operation unit 304 continues for the predetermined time (threshold) or more, the operation unit 304 can be shifted to the power saving state and the wireless connection between the mobile terminal 300 and the image forming apparatus 100 can be broken. While the power saving of the operation unit 304 in the first embodiment involves stopping the touch panel function, turning off the backlight, etc., the power saving may be applied not only to the operation unit 304 but also to other blocks of the mobile terminal 300 simultaneously.

Following this, in step S610, the CPU 301 stops the time count by the timer 308 via the system bus 310, and advances to step S611. In the case where the CPU 301 determines in step S608 that the operation unit 304 is in the power saving state, on the other hand, the CPU 301 advances to step S611. In step S611, the CPU 301 determines whether or not the request to disconnect the wireless LAN communication 800 has been transmitted to the image forming apparatus 100 via the wireless LAN communication 800. The mobile terminal 300 according to the first embodiment holds a disconnection request transmission flag indicating whether or not the request to disconnect the wireless LAN communication 800 has been transmitted, in the RAM 302. Accordingly, the CPU 301 can determine whether or not the request to disconnect the wireless LAN communication 800 has been transmitted, by checking the flag stored in the RAM 302. In the case where the CPU 301 determines in step S611 that the request to disconnect the wireless LAN communication 800 has not been transmitted to the image forming apparatus 100, the CPU 301 advances to step S612. In step S612, the CPU 301 transmits the request to disconnect the wireless LAN communication 800 to the image forming apparatus 100, sets the above-mentioned disconnection request transmission flag in the RAM 302, and advances to step S613.

In the case where the CPU 301 determines in step S611 that the request to disconnect the wireless LAN communication 800 has been already transmitted, on the other hand, the CPU 301 advances to step S613. In step S613, the CPU 301 determines whether or not the wireless LAN communication 800 has been disconnected, by referencing the value of a register (not shown) indicating the state of the wireless LAN module 306 via the system bus 310. In the case where the CPU 301 determines in step S613 that the wireless LAN communication 800 has not been disconnected, the CPU 301 advances to step S604, and determines again whether or not the user has operated the mobile terminal 300. In the case where the CPU 301 determines in step S613 that the wireless LAN communication 800 has been disconnected, the CPU 301 advances to step S614. In step S614, as the process of disconnecting the wireless LAN communication 800, the CPU 301 initializes the wireless LAN module 306 via the system bus 310, and then sets a register (not shown) for power saving control of the wireless LAN module 306 to shift to the power saving state. The CPU 301 thus ends the process.

In the case where the CPU 301 determines in step S607 that the count time of the timer 308 does not exceed the threshold, the CPU 301 advances to step S615, and determines whether or not the wireless LAN disconnection request has been already made, based on the disconnection request transmission flag for the wireless LAN communication 800 in the RAM 302. In the case where the CPU 301 determines in step S615 that the request to disconnect the wireless LAN communication 800 has been transmitted, the CPU 301 advances to step S613, and determines whether or not the wireless LAN communication 800 has been disconnected. In the case where the CPU 301 determines in step S615 that the request to disconnect the wireless LAN communication 800 has not been transmitted, the CPU 301 advances to step S604, and determines whether or not the user has operated the operation unit 304.

As described above, according to the first embodiment, when the mobile terminal 300 and the image forming apparatus 100 are wirelessly connected, the mobile terminal 300 can break the wireless connection with the image forming apparatus 100 in the case where the condition for shifting the mobile terminal 300 to the power saving state is met and the mobile terminal shifts to the power saving state. Thus, the mobile terminal 300 can autonomously break the wireless connection.

Second Embodiment

The following describes a second embodiment of the present invention. The structures of the image forming apparatus 100 and the mobile terminal 300 according to the second embodiment are the same as the structures in the first embodiment described above, and so their description is omitted. The second embodiment describes the case where the image forming apparatus 100 breaks the wireless connection with the mobile terminal 300 in the case where the condition for shifting to the power saving state is met, in contrast to the first embodiment.

Figure 7:
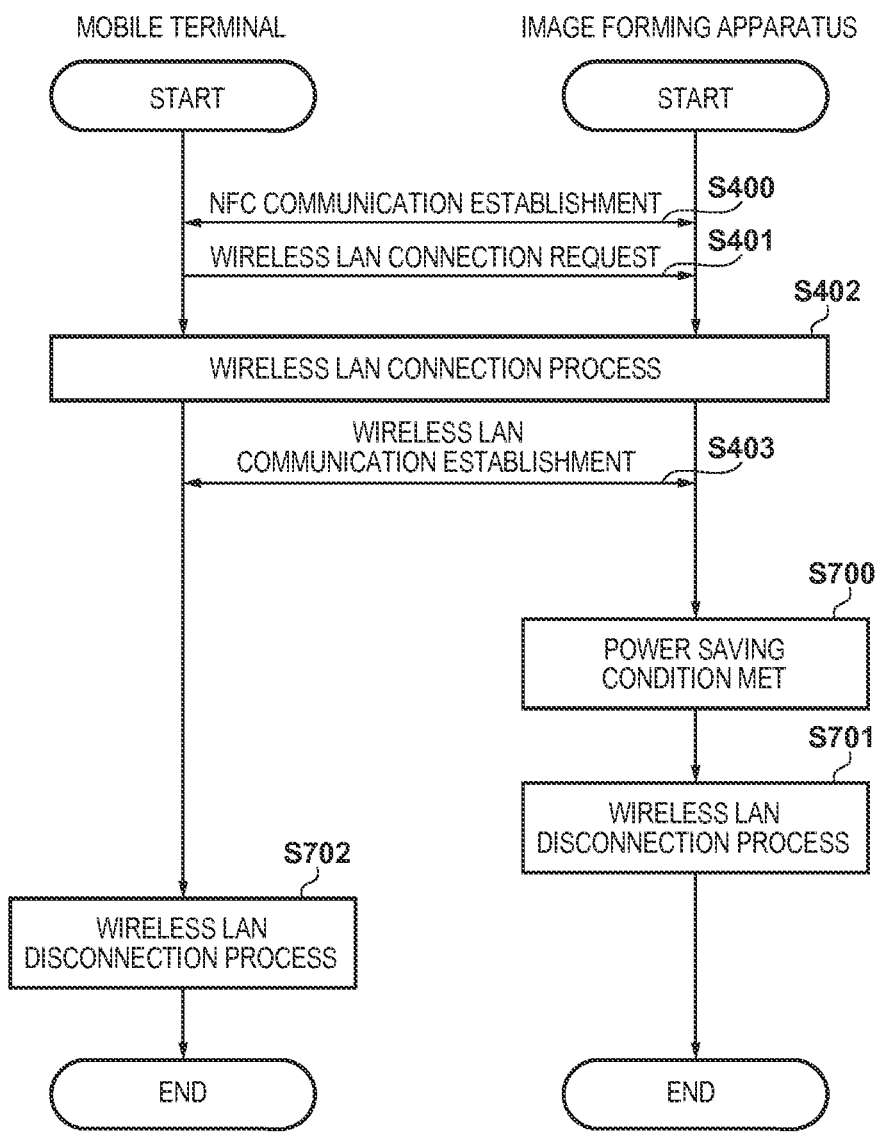
FIG. 7 is a sequence diagram describing a cooperative operation between an image forming apparatus and a mobile terminal according to a second embodiment of the present invention.

FIG. 7 is a sequence diagram describing a cooperative operation between the image forming apparatus 100 and the mobile terminal 300 according to the second embodiment of the present invention. In FIG. 7, the same parts as in FIG. 4 described above are given the same reference signs, and their description is omitted.

In steps S401 to S403, the image forming apparatus 100 and the mobile terminal 300 perform Wi-Fi Direct connection via the NFC communication 700. In step S700, in the case where the image forming apparatus 100 meets a condition for shifting to the power saving state, such as when no user operation has been detected for the predetermined time or when no print job has been received for the predetermined time, the image forming apparatus 100 shifts to the power saving state. In step S701, the image forming apparatus 100 executes the process of disconnecting the wireless LAN communication 800 with the mobile terminal 300. The mobile terminal 300 detects the disconnection of the wireless LAN communication 800, and executes its process of disconnecting the wireless LAN communication 800 in step S702.

Figure 8:
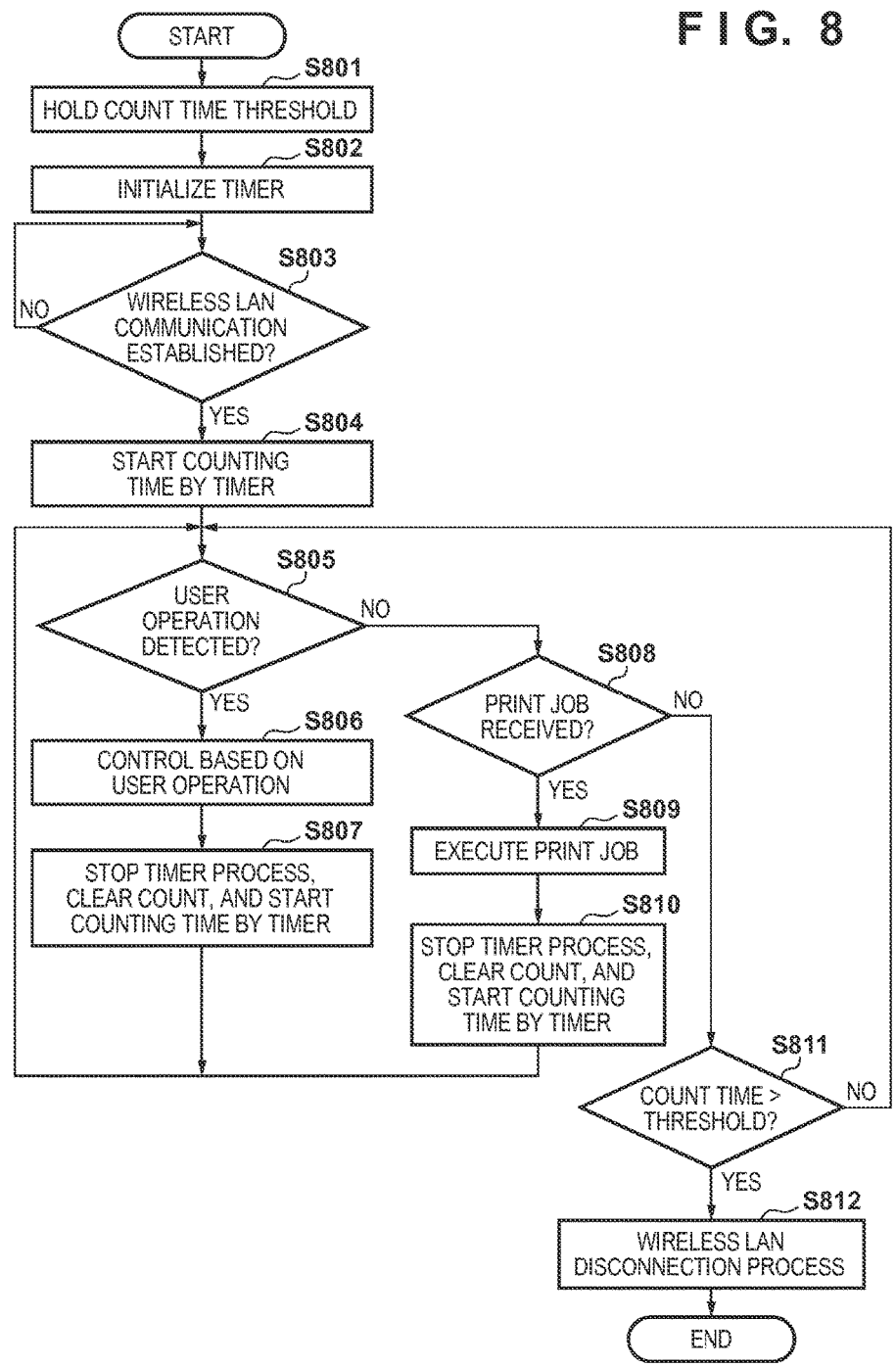
FIG. 8 is a flowchart describing a wireless LAN disconnection process by the image forming apparatus according to the second embodiment of the present invention.

FIG. 8 is a flowchart describing the wireless LAN disconnection process by the image forming apparatus 100 according to the second embodiment of the present invention. This process is executed by the CPU 101 based on the program expanded onto the RAM 102 as a result of the CPU 101 executing the boot program stored in the ROM 103 after the image forming apparatus 100 is powered on.

First, in step S801, the CPU 101 reads a threshold of the count time for shifting the image forming apparatus 100 to the power saving state from the HDD 104, and holds the threshold in the RAM 102. Although this threshold is a fixed value in the image forming apparatus 100 according to the second embodiment, the threshold may be a programmable value. Next, in step S802, the CPU 101 initializes the timer 121 to clear the count time via the system bus 114. Next, in step S803, the CPU 101 determines whether or not the wireless LAN communication 800 with the mobile terminal 300 has been established, by referencing the value of a register (not shown) indicating the state of the wireless LAN module 108 via the system bus 114. In the case where the CPU 101 determines in step S803 that the wireless LAN module 108 has not established the communication, the CPU 101 waits until the wireless LAN communication 800 is established, and then advances to step S804. In step S804, the CPU 101 instructs the timer 121 to start counting time via the system bus 114.

Next, in step S805, the CPU 101 determines whether or not the user has operated the image forming apparatus 100 via the operation unit 120. In the case where the CPU 101 detects the operation by the user, the CPU 101 advances to step S806, and controls the image forming apparatus 100 based on the user operation. Next, in step S807, the CPU 101 instructs the timer 121 to stop counting time, clear the count time, and start counting time via the system bus 114, and advances to step S805. Thus, each time the user operation is detected, the CPU 101 executes the operation according to the user operation, and instructs the timer 121 to clear the count time and start counting time for determining whether or not to shift to the power saving mode.

In the case where the CPU 101 does not detect the user operation in step S805, the CPU 101 advances to step S808, and determines whether or not a print job has been received via the wired LAN module 107 or the wireless LAN module 108. In the case where the CPU 101 determines in step S808 that the print job has been received, the CPU 101 advances to step S809, and executes printing according to the received print job. Next, in step S810, the CPU 101 instructs the timer 121 to stop counting time, clear the count time, and start counting time via the system bus 114, and advances to step S805. Thus, each time the print job is received, the CPU 101 executes the print job, and instructs the timer 121 to clear the count time and start counting time for determining whether or not to shift to the power saving state.

In the case where the CPU 101 determines in step S808 that the print job has not been received, the CPU 101 advances to step S811. In step S811, the CPU 101 reads the count time of the timer 121 via the system bus 114, and compares the count time with the threshold held in the RAM 102 in step S801. The CPU 101 determines whether or not the count time of the timer 121 exceeds the threshold. In the case where the CPU 101 determines that the count time of the timer 121 does not exceed the threshold, the CPU 101 advances to step S805, and performs the user operation detection process again. In the case where the CPU 101 determines in step S811 that the count time of the timer 121 exceeds the threshold, i.e. the condition for shifting to the power saving state is met, the CPU 101 advances to step S812. In step S812, the CPU 101 executes the process of disconnecting the wireless LAN communication 800 with the mobile terminal 300 with which the image forming apparatus 100 has established the communication, and ends this process. The image forming apparatus 100 according to the second embodiment is based on the use of Wi-Fi Direct that enables connection with a plurality of mobile terminals 300. Accordingly, in step S812, the CPU 101 disconnects the communication with all mobile terminals 300 with which the image forming apparatus 100 has established the communication.

Moreover, the image forming apparatus 100 according to the second embodiment of the present invention is based on an example where the core network of the office is connected to the wired LAN module 107 and the local mobile terminal is connected to the wireless LAN module 108. However, the wireless LAN module 108 may be connected to a wireless LAN access point (not shown) connected to the core network of the office. In this use case, when executing Wi-Fi Direct, the communication destination of the wireless LAN communication 800 is switched from the wireless LAN access point (not shown) to the mobile terminal 300. After the Wi-Fi Direct communication is disconnected, the communication destination of the wireless LAN communication 800 may be switched back to the wireless LAN access point (not shown).

There is also a possibility that only one line of network protocol stack is implemented in the image forming apparatus 100, depending on the image forming apparatus 100. In such a case, normally, the wired LAN module 107 or the wireless LAN module 108 is connected to the core network of the office. When executing Wi-Fi Direct, the communication with the core network is disconnected, and the wireless LAN communication 800 with the mobile terminal 300 is established via the wireless LAN module 108. After the Wi-Fi Direct communication is disconnected, control may be switched to the immediately previous communication state (the communication by the wired LAN module 107 or the wireless LAN module 108).

Figure 9:
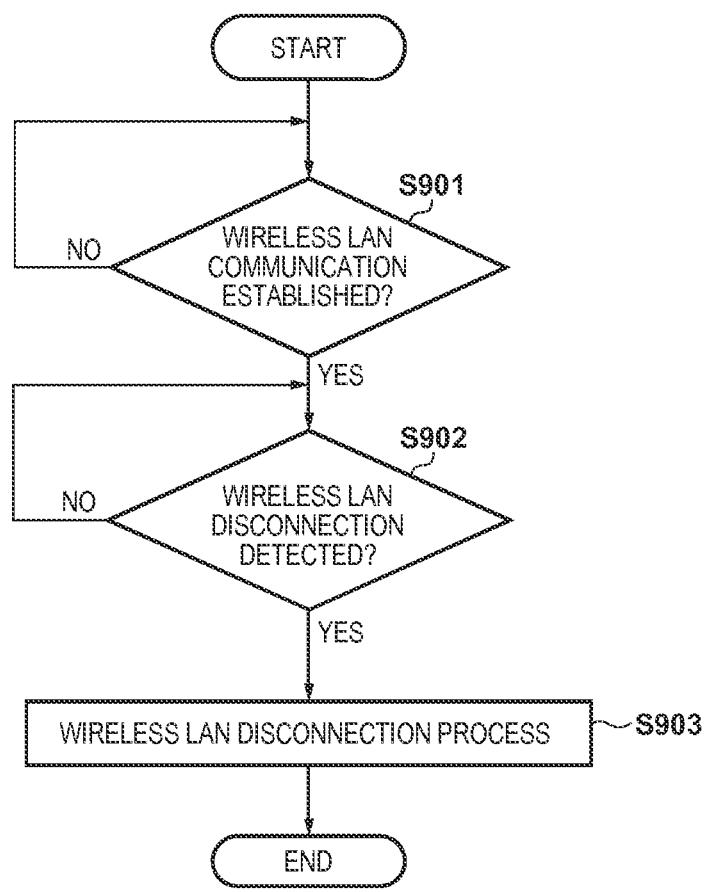
FIG. 9 is a flowchart describing a wireless LAN disconnection process by the mobile terminal according to the second embodiment of the present invention.

FIG. 9 is a flowchart describing the wireless LAN disconnection process by the mobile terminal 300 according to the second embodiment of the present invention. The process shown in this flowchart is realized by the CPU 301 executing the program expanded from the flash ROM 303 onto the RAM 302 after the mobile terminal 300 is powered on.

First, in step S901, the CPU 301 determines whether or not the wireless LAN communication 800 has been established, by referencing the value of a register (not shown) indicating the state of the wireless LAN module 306 via the system bus 310. In the case where the CPU 301 determines in step S901 that the wireless LAN module 306 has not established the communication, the CPU 301 waits until the wireless LAN communication 800 is established. In the case where the CPU 301 determines in step S901 that the wireless LAN communication 800 has been established, the CPU 301 advances to step S902. In step S902, the CPU 301 determines whether or not the wireless LAN communication 800 has been disconnected, by referencing the value of the register (not shown) indicating the state of the wireless LAN module 306 via the system bus 310. In the case where the CPU 301 determines in step S902 that the wireless LAN communication 800 has not been disconnected, the CPU 301 waits until the wireless LAN communication 800 is disconnected. In the case where the CPU 301 determines in step S902 that the wireless LAN communication 800 has been disconnected, the CPU 301 advances to step S903, and executes the process of disconnecting the wireless LAN communication 800. Here, the CPU 301 initializes the wireless LAN module 306 via the system bus 310, and then sets a register (not shown) for power saving control of the wireless LAN module 306 to shift to the power saving state.

As described above, according to the second embodiment, when the mobile terminal 300 and the image forming apparatus 100 are wirelessly connected, the image forming apparatus 100 can break the wireless connection with the mobile terminal 300 in the case where the condition for the image forming apparatus 100 to shift to the power saving state is met and the image forming apparatus 100 shifts to the power saving state. Thus, the image forming apparatus 100 can autonomously break the wireless connection.

Third Embodiment

Figure 10:
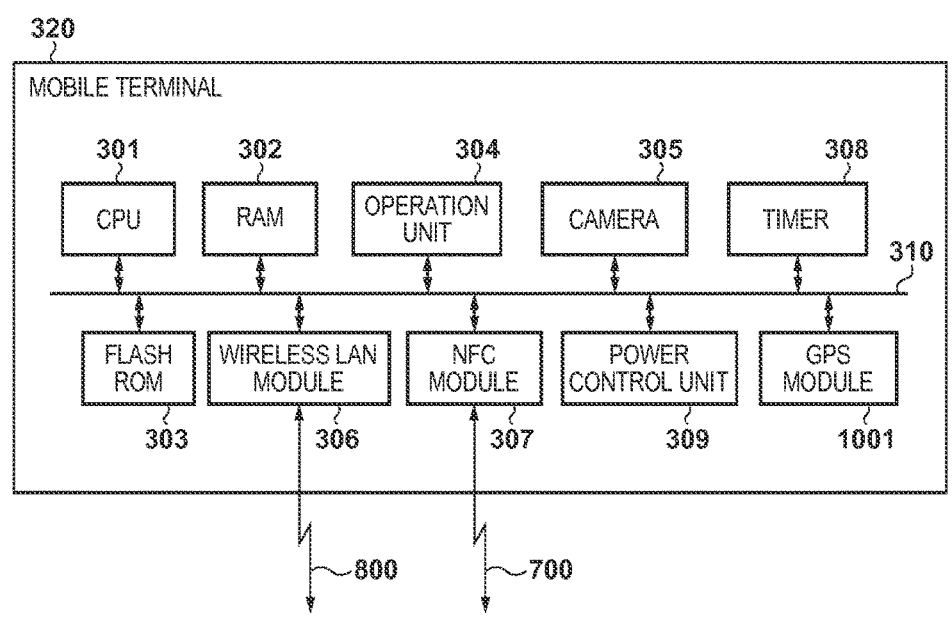
FIG. 10 is a block diagram showing the structure of a mobile terminal according to a third embodiment of the present invention.

FIG. 10 is a block diagram showing the structure of the mobile terminal 320 according to a third embodiment of the present invention. In FIG. 10, the same parts as the structure of the mobile terminal 300 in FIG. 3 according to the first embodiment described above are given the same reference signs, and their description is omitted. The third embodiment describes the case where the mobile terminal 320 monitors the distance from the image forming apparatus 100 and, when the distance reaches a predetermined distance or more, breaks the wireless connection with the image forming apparatus 100.

The mobile terminal 320 includes a GPS module 1001. GPS stands for Global Positioning System, and indicates a satellite positioning system having position detection function. The GPS module 1001 includes an antenna unit (not shown) for receiving a signal from each GPS satellite, and a processing unit (not shown) for calculating the distance from the GPS satellite using the received signal. The CPU 301 can obtain the position information of the mobile terminal 320 from the GPS module 1001 via the system bus 310.

FIG. 11 is a sequence diagram describing a cooperative operation between the image forming apparatus 100 and the mobile terminal 320 according to the third embodiment of the present invention. The same processes as in FIG. 4 described above are given the same reference signs, and their description is omitted.

The image forming apparatus 100 and the mobile terminal 320 perform Wi-Fi Direct connection via the NFC communication 700 (steps S400 to S403). When the NFC communication 700 is established, the mobile terminal 320 obtains the position information of the mobile terminal 320 from the GPS module 1001. This position information is supposed to indicate the position of the image forming apparatus 100. The mobile terminal 320 transmits a print job to the image forming apparatus 100 via the wireless LAN communication 800 based on an operation by the user, and the image forming apparatus 100 executes printing according to the received print job. After this, the user, carrying the paper document printed by the image forming apparatus 100, moves away from the image forming apparatus 100. Here, in step S1101, the mobile terminal 320 obtains the position information of the mobile terminal 320 from the GPS module 1001 at appropriate timings, and compares the position information with the position information of the image forming apparatus 100 obtained when the NFC communication 700 is established. The mobile terminal 320 detects that the mobile terminal 320 has moved away from the image forming apparatus 100 by the predetermined distance, based on the position information from the GPS module 1001 (step S1102). In step S405, the mobile terminal 320 requests the image forming apparatus 100 to disconnect the wireless LAN communication 800, via the wireless LAN communication 800. The image forming apparatus 100 receives the request to disconnect the wireless LAN communication 800 from the mobile terminal 320, and the image forming apparatus 100 and the mobile terminal 320 each execute the wireless LAN disconnection process (steps S406 and S407). Lastly, in step S1103, the mobile terminal 320 stops the function of the GPS module 1001, and performs the end process.

The wireless LAN disconnection process by the image forming apparatus 100 according to the third embodiment is the same as that in the flowchart in FIG. 5 according to the first embodiment described above, and so its description is omitted.

Figure 12A:
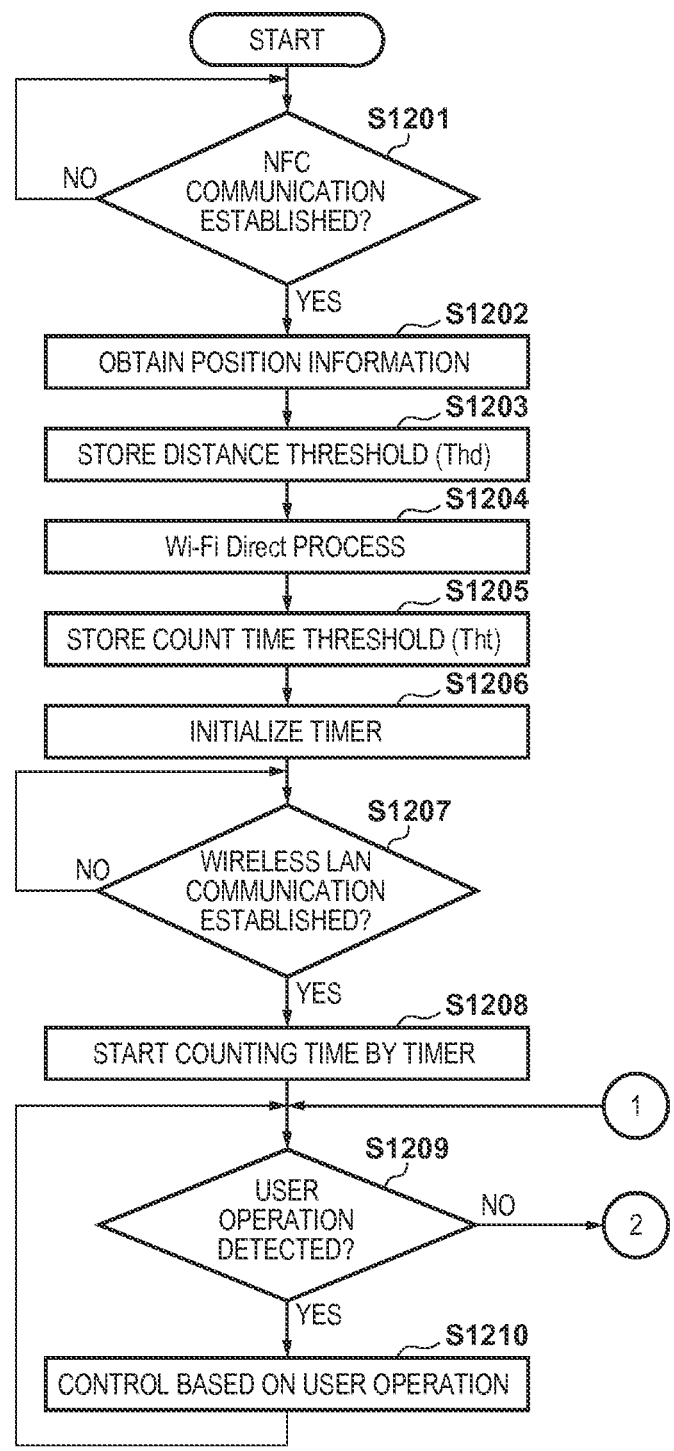
FIGS. 12A and 12B are flowcharts describing a wireless LAN disconnection process by the mobile terminal according to the third embodiment of the present invention.
Figure 12B:
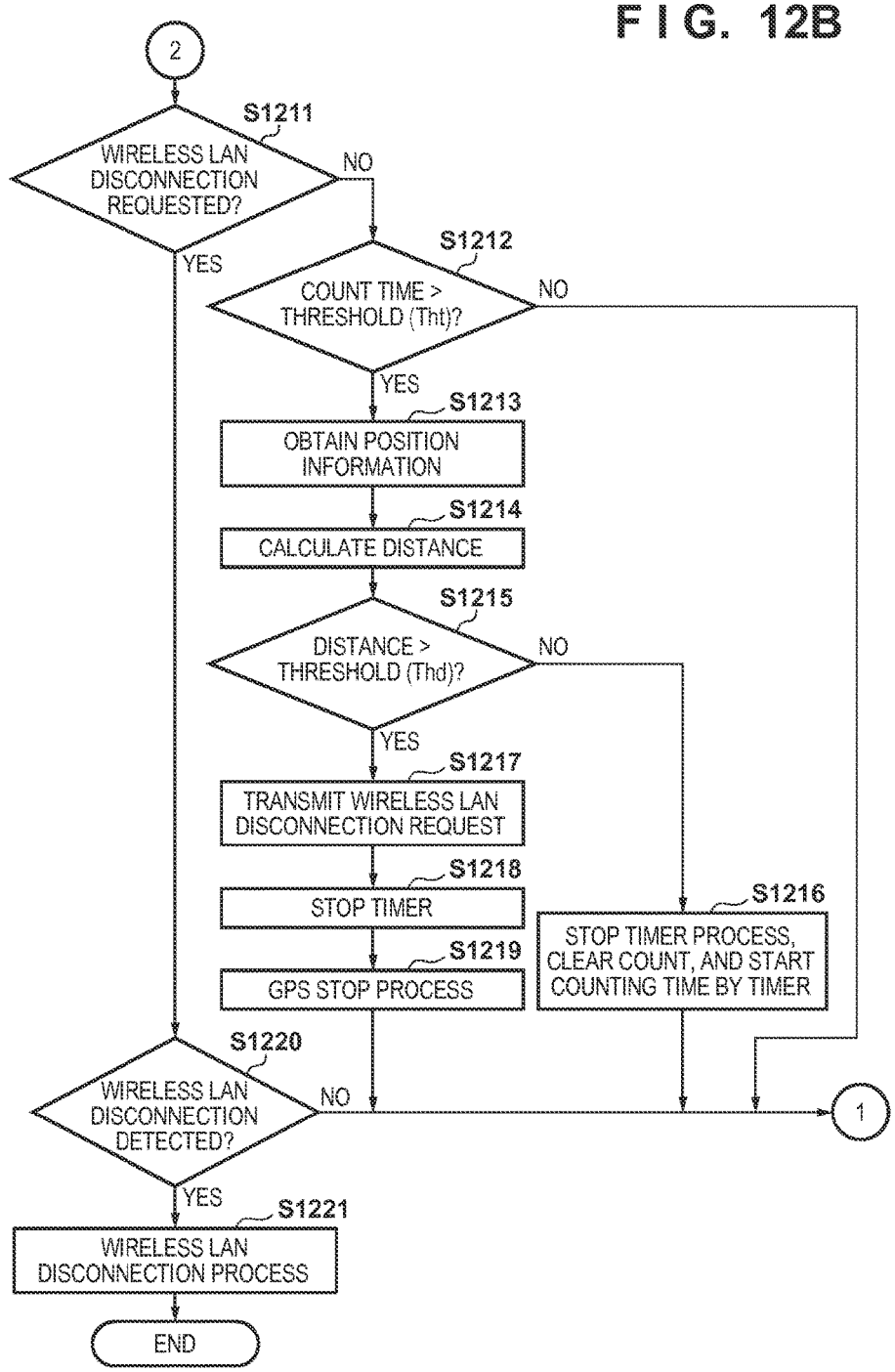

FIGS. 12A and 12B are flowcharts describing the wireless LAN disconnection process by the mobile terminal 320 according to the third embodiment of the present invention. The process shown in this flowchart is realized by the CPU 301 executing the program expanded from the flash ROM 303 onto the RAM 302 after the mobile terminal 320 is powered on.

The CPU 301 transmits a command for establishing the NFC communication 700 to the NFC module 307 via the system bus 310, to establish the NFC communication 700 between the mobile terminal 320 and the image forming apparatus 100. In step S1201, the CPU 301 determines whether or not the NFC communication 700 has been established, based on the information of a register (not shown) indicating the state of the NFC module 307. In the case where the CPU 301 determines that the NFC communication 700 has been established, the CPU 301 advances to step S1202. In step S1202, the CPU 301 obtains position information from the GPS module 1001, and holds the position information in the RAM 302 as the position information of the image forming apparatus 100. Since the NFC communication is performed at a distance of about 10 cm, the position detected by the GPS module 1001 in the mobile terminal 320 can be regarded as the position of the image forming apparatus 100.

Next, in step S1203, the CPU 301 reads, from the flash ROM 303, a threshold (Thd) corresponding to the distance between the mobile terminal 320 and the image forming apparatus 100 at which the wireless connection is broken, and stores the distance threshold in the RAM 302. Next, in step S1204, the CPU 301 executes Wi-Fi Direct connection based on the sequence determined between the mobile terminal 320 and the image forming apparatus 100. After this, in step S1205, the CPU 301 reads, from the flash ROM 303, a timer threshold (Tht) for generating the timing of reading GPS position information, and stores the timer threshold in the RAM 302. Although the distance threshold (Thd) and the time count threshold (Tht) are fixed values in the mobile terminal 320 according to the third embodiment, the thresholds may be programmable values. Next, in step S1206, the CPU 301 initializes the timer 308 to clear the count time via the system bus 310.

Next, in step S1207, the CPU 301 determines whether or not the wireless LAN communication 800 has been established with the image forming apparatus 100, by referencing the value of a register (not shown) indicating the state of the wireless LAN module 306 via the system bus 310. In the case where the CPU 301 determines that the wireless LAN module 306 has not established the communication, the CPU 301 waits until the wireless LAN communication 800 is established, and then advances to step S1208. In step S1208, the CPU 301 instructs the timer 308 to start counting time via the system bus 310.

Next, in step S1209, the CPU 301 determines whether or not the user has operated the operation unit 304 of the mobile terminal 320. In the case where the CPU 301 detects the operation by the user, the CPU 301 advances to step S1210, and controls the mobile terminal 320 according to the user operation. The CPU 301 then advances to step S1209. In the case where the CPU 301 does not detect the user operation in step S1209, the CPU 301 advances to step S1211, and determines whether or not the request to disconnect the wireless LAN communication 800 has been transmitted to the image forming apparatus 100 via the wireless LAN communication 800. The mobile terminal 320 according to the third embodiment holds a disconnection request transmission flag (not shown) indicating whether or not the request to disconnect the wireless LAN communication 800 has been transmitted, in the RAM 302. Accordingly, the CPU 301 can determine whether or not the request to disconnect the wireless LAN communication 800 has been transmitted, by checking the flag stored in the RAM 302. In the case where the CPU 301 determines in step S1211 that the request to disconnect the wireless LAN communication 800 has not been transmitted to the image forming apparatus 100, the CPU 301 advances to step S1212. In the case where the CPU 301 determines in step S1211 that the request to disconnect the wireless LAN communication 800 has been transmitted, the CPU 301 advances to step S1220.

In step S1212, the CPU 301 reads the count value of the timer 308 via the system bus 310, and compares the count value with the timer threshold (Tht) stored in the RAM 302 in step S1205. In the case where the CPU 301 determines that the count value of the timer 308 does not exceed the timer threshold (Tht), the CPU 301 returns to step S1209, and performs the user operation detection process again. In the case where the CPU 301 determines in step S1212 that the count value of the timer 308 exceeds the timer threshold (Tht), the CPU 301 advances to step S1213, and obtains position information from the GPS module 1001. Thus, the count time of the timer 308 defines the timing of checking the position by the GPS module 1001.

Next, in step S1214, the CPU 301 calculates the distance between the image forming apparatus 100 and the mobile terminal 320, from the position information of the image forming apparatus 100 stored in the RAM 302 in step S1202 and the position information obtained from the GPS module in step S1213. Next, in step S1215, the CPU 301 compares the distance calculated in step S1214 with the distance threshold (Thd) held in the RAM 302 in step S1203. In the case where the calculated distance does not exceed the threshold (Thd), the CPU 301 advances to step S1216. In step S1216, the CPU 301 instructs the timer 308 to stop counting time, clear the count time, and start counting time via the system bus 310, and advances to step S1209 to perform the user operation detection process again.

In the case where the CPU 301 determines in step S1215 that the calculated distance exceeds the threshold (Thd), the CPU 301 advances to step S1217. In step S1217, the CPU 301 transmits the request to disconnect the wireless LAN communication 800 to the image forming apparatus 100, and sets the disconnection request transmission flag in the RAM 302. Next, in step S1218, the CPU 301 stops counting time by the timer 308 via the system bus 310. Next, in step S1219, the CPU 301 stops the process of the GPS module 1001 via the system bus 310, and advances to step S1220.

As the process of stopping the GPS module 1001, the mobile terminal 320 according to the third embodiment not only initializes the GPS module 1001 but also sets a register (not shown) for power saving control of the GPS module 1001 to shift to the power saving state.

In step S1220, the CPU 301 determines whether or not the wireless LAN communication 800 has been disconnected, by referencing a register (not shown) indicating the state of the wireless LAN module 306 via the system bus 310. In the case where the CPU 301 determines in step S1220 that the wireless LAN communication 800 has not been disconnected, the CPU 301 advances to step S1209, and performs the user operation detection process again. In the case where the CPU 301 determines in step S1220 that the wireless LAN communication 800 has been disconnected, the CPU 301 advances to step S1221. In step S1221, as the process of disconnecting the wireless LAN communication 800, the CPU 301 initializes the wireless LAN module 306 via the system bus 310, and then sets the register (not shown) for power saving control of the wireless LAN module 306 to shift to the power saving state. The CPU 301 thus ends the process.

As described above, according to the third embodiment, the mobile terminal 320 can automatically break the wireless LAN connection between the mobile terminal 320 and the image forming apparatus 100, when the distance between the mobile terminal 320 and the image forming apparatus 100 reaches the predetermined distance or more.

Fourth Embodiment

The following describes a fourth embodiment of the present invention. An image forming apparatus and a mobile terminal according to the fourth embodiment are the same as those in the third embodiment described above, and so their description is omitted. The fourth embodiment describes an example where the mobile terminal 320 transmits the position information of the mobile terminal 320 to the image forming apparatus 100, and the image forming apparatus 100 breaks the wireless connection with the mobile terminal 320 upon determining that the distance from the mobile terminal 320 has reached a predetermined distance or more.

FIG. 13 is a sequence diagram describing a cooperative operation between the image forming apparatus 100 and the mobile terminal 320 according to the fourth embodiment of the present invention. The same processes as in FIGS. 4, 7, and 11 described above are given the same reference signs, and their description is omitted.

After the NFC communication 700 is established (step S400), the mobile terminal 320 obtains the position information of the mobile terminal 320 from the GPS module 1001 (step S1101). The mobile terminal 320 transmits the obtained position information to the image forming apparatus 100 via the NFC communication 700, as the position information of the image forming apparatus 100 (step S1301). After this, the mobile terminal 320 transmits the request to connect the wireless LAN communication 800 to the image forming apparatus 100, via the NFC communication 700 (step S401). As a result of the process of connecting the wireless LAN communication 800 between the image forming apparatus 100 and the mobile terminal 320 in step S402, the wireless LAN communication 800 between the image forming apparatus 100 and the mobile terminal 320 is established.

After the wireless LAN communication 800 is established, in step S1302 the mobile terminal 320 transmits the position information of the mobile terminal 320 to the image forming apparatus 100 via the wireless LAN communication 800. In step S1303, the image forming apparatus 100 calculates the distance between the image forming apparatus 100 and the mobile terminal 320, based on the position information of the mobile terminal 320 received via the wireless LAN communication 800. In the case where the image forming apparatus 100 determines in step S1304 that the distance between the image forming apparatus 100 and the mobile terminal 320 meets a predetermined condition, the image forming apparatus 100 performs the process of disconnecting the wireless LAN communication 800 in step S701. The mobile terminal 320 detects the disconnection of the wireless LAN communication 800, and executes its process of disconnecting the wireless LAN communication 800 (step S702). In step S1103, the mobile terminal 320 performs the end process of stopping the function of the GPS module 1001.

FIG. 14 is a flowchart describing the wireless LAN disconnection process by the image forming apparatus 100 according to the fourth embodiment of the present invention. This process is executed by the CPU 101 based on the program expanded onto the RAM 102 as a result of the CPU 101 executing the boot program stored in the ROM 103 after the image forming apparatus 100 is powered on.

The CPU 101 transmits a command for establishing the NFC communication 700 to the NFC module 106 via the system bus 114, to establish the NFC communication 700 between the mobile terminal 320 and the image forming apparatus 100. First, in step S1401, the CPU 101 determines whether or not the NFC communication 700 has been established, by referencing a register (not shown) indicating the state of the NFC module 106. In the case where the CPU 101 determines that the NFC communication 700 has been established, the CPU 101 advances to step S1402. In step S1402, the CPU 101 reads a distance threshold (Thd) between the mobile terminal 320 and the image forming apparatus 100 from the HDD 104, and stores the distance threshold in the RAM 102. Although the distance threshold (Thd) is a fixed value in the image forming apparatus 100 according to the fourth embodiment, the threshold may be a programmable value.

Next, in step S1403, the CPU 101 receives the position information of the image forming apparatus 100 from the mobile terminal 320 via the NFC communication 700, and stores the position information in the RAM 102. Next, in step S1404, the CPU 101 executes Wi-Fi Direct connection based on the sequence determined between the mobile terminal 320 and the image forming apparatus 100. After this, in step S1405, the CPU 101 determines whether or not the wireless LAN communication 800 has been established, by referencing a register (not shown) indicating the state of the wireless LAN module 108 via the system bus 114. In the case where the CPU 101 determines that the wireless LAN module 108 has not established the communication, the CPU 101 waits in step S1405 until the wireless LAN communication 800 is established. In the case where the CPU 101 determines in step S1405 that the wireless LAN communication 800 has been established, the CPU 101 advances to step S1406, and waits for receiving the ID information and position information of the mobile terminal 320 from the mobile terminal 320 via the wireless LAN communication 800.

When the CPU 101 receives the ID information and position information of the mobile terminal 320 in step S1406, the CPU 101 advances to step S1407. In step S1407, the CPU 101 calculates the distance between the mobile terminal 320 and the image forming apparatus 100, based on the position information of the image forming apparatus 100 held in the RAM 102 in step S1403 and the position information of the mobile terminal 320 received in step S1406. Next, in step S1408, the CPU 101 compares the distance calculated in step S1407 with the distance threshold (Thd) stored in the RAM 102 in step S1402. In the case where the CPU 101 determines that the calculated distance does not exceed the threshold (Thd), the CPU 101 advances to step S1406, and waits for receiving the ID information and position information of the mobile terminal 320 from the mobile terminal 320 via the wireless LAN communication 800 again. In the case where the CPU 101 determines in step S1408 that the calculated distance exceeds the threshold (Thd), the CPU 101 advances to step S1409. In step S1409, the CPU 101 executes the process of disconnecting the wireless LAN communication 800 with the mobile terminal 320 with which the wireless communication has been established, based on the ID information of the mobile terminal 320 received in step S1406.

The image forming apparatus 100 according to the fourth embodiment is based on the use of Wi-Fi Direct that enables connection with a plurality of mobile terminals 320. In Wi-Fi Direct of one-to-one connection form, on the other hand, the image forming apparatus 100 can execute the process of disconnecting the wireless LAN communication with the mobile terminal 320 without receiving the ID information of the mobile terminal 320.

Moreover, the image forming apparatus 100 according to the fourth embodiment is based on an example where the core network of the office is connected to the wired LAN module 107 and the local mobile terminal is connected to the wireless LAN module 108. However, the wireless LAN module 108 may be connected to a wireless LAN access point (not shown) connected to the core network of the office. In this case, when executing Wi-Fi Direct, the communication destination of the wireless LAN communication 800 is switched from the wireless LAN access point (not shown) to the mobile terminal 320. After the Wi-Fi Direct communication is disconnected, the communication destination of the wireless LAN communication 800 may be switched back to the wireless LAN access point (not shown).

There is also a possibility that only one line of network protocol stack is implemented in the image forming apparatus 100. In such a case, normally, the wired LAN module 107 or the wireless LAN module 108 is connected to the core network of the office. When executing Wi-Fi Direct, the communication with the core network is disconnected, and the wireless LAN communication 800 with the mobile terminal 320 is established via the wireless LAN module 108. After the Wi-Fi Direct communication is disconnected, control may be switched to the immediately previous communication state (the communication by the wired LAN module 107 or the wireless LAN module 108).

Figure 15A:
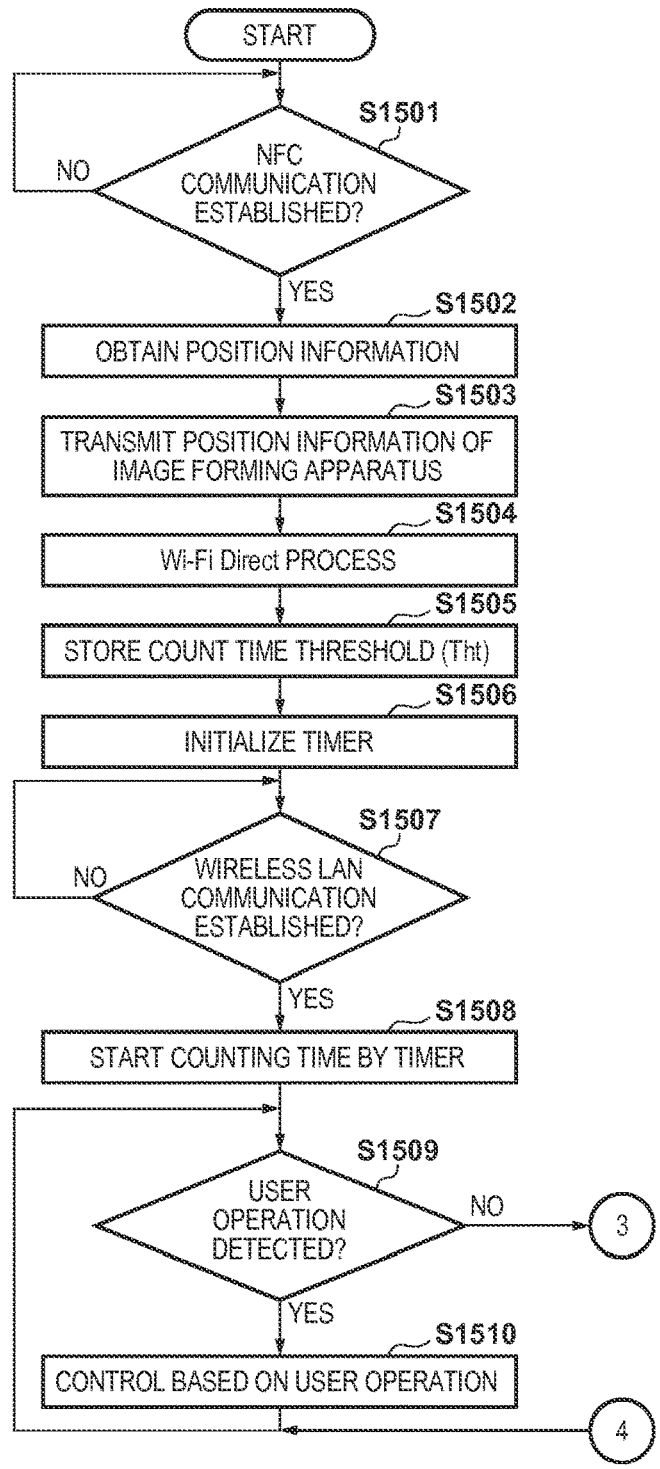
FIGS. 15A and 15B are flowcharts describing a wireless LAN disconnection process by the mobile terminal according to the fourth embodiment of the present invention.
Figure 15B:
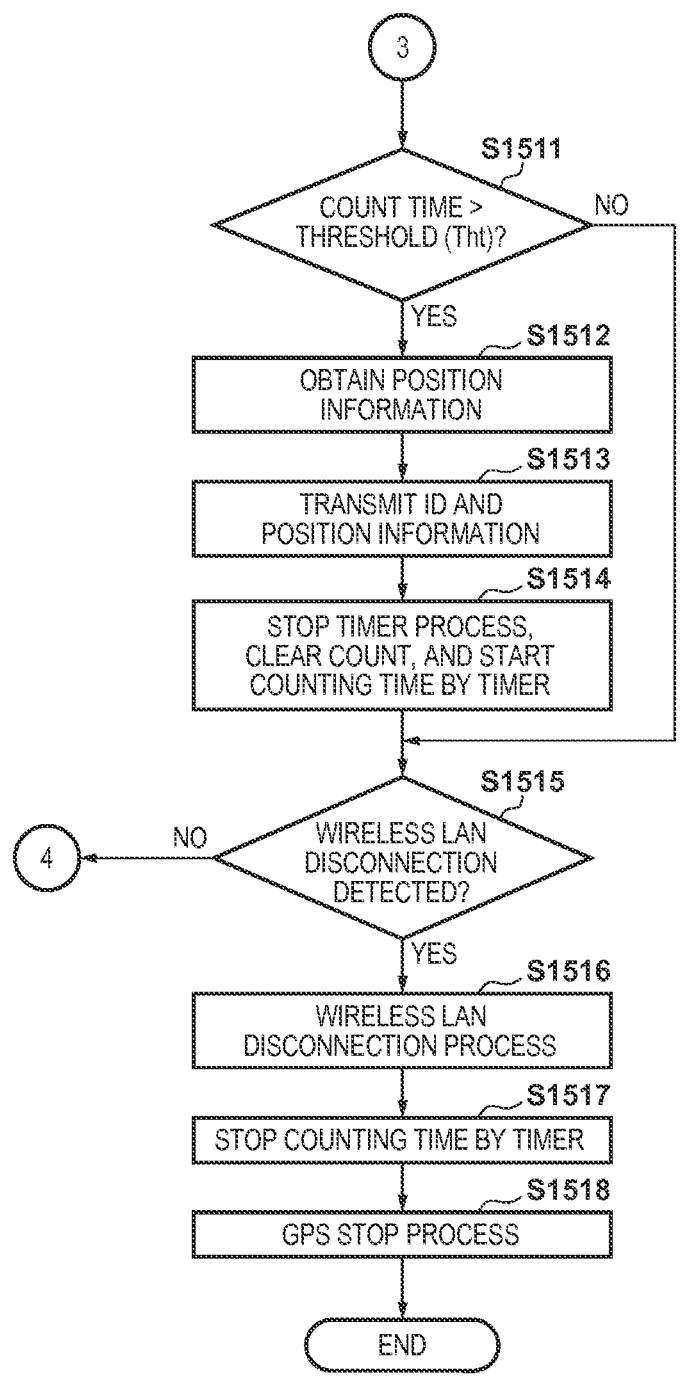

FIGS. 15A and 15B are flowcharts describing the wireless LAN disconnection process by the mobile terminal 320 according to the fourth embodiment of the present invention. The process shown in this flowchart is realized by the CPU 301 executing the program expanded from the flash ROM 303 onto the RAM 302 after the mobile terminal 320 is powered on.

In the case where the CPU 301 determines in step S1501 that the NFC communication 700 has been established with the image forming apparatus 100, the CPU 301 advances to step S1502. In step S1502, the CPU 301 obtains position information from the GPS module 1001. In step S1503, the CPU 301 transmits the position information to the image forming apparatus 100 via the NFC communication 700, as the position information of the image forming apparatus 100. Next, in step S1504, the CPU 301 executes Wi-Fi Direct connection with the image forming apparatus 100. Next, in step S1505, the CPU 301 reads, from the flash ROM 303, a timer threshold (Tht) for defining the timing of obtaining GPS position information from the GPS module 1001, and stores the timer threshold in the RAM 302. The CPU 301 then advances to step S1506, and initializes the timer 308 to clear the count time.

Next, in step S1507, the CPU 301 determines whether or not the wireless LAN communication 800 has been established with the image forming apparatus 100. In the case where the CPU 301 determines that the wireless LAN communication 800 has been established, the CPU 301 advances to step S1508, and instructs the timer 308 to start counting time. Next, in step S1509, the CPU 301 determines whether or not a user operation via the operation unit 304 is detected. In the case where the CPU 301 detects the operation, the CPU 301 advances to step S1510, and executes the process according to the operation. The CPU 301 then advances to step S1509.

In the case where the CPU 301 does not detect the user operation in step S1509, the CPU 301 advances to step S1511, and compares the count time of the timer 308 with the threshold (Tht) stored in step S1505. In the case where the CPU 301 determines that the count time of the timer 308 exceeds the timer threshold (Tht), the CPU 301 advances to step S1512, and obtains position information from the GPS module 1001. Next, in step S1514, the CPU 301 transmits the ID information and position information of the mobile terminal 320 to the information forming apparatus 100 via the wireless LAN communication 800. After this, in step S1514, the CPU 301 instructs the timer 308 to stop counting time and clear the count time, and thereafter instructs the timer 308 to start counting time, and then advances to step S1515. In the case where the CPU 301 determines in step S1511 that the count time of the timer 308 does not exceed the timer threshold (Tht), the CPU 301 advances to step S1515. Thus, the CPU 301 obtains the position information of the mobile terminal 320 and transmits the position information to the image forming apparatus 100 at intervals of the predetermined time (the threshold (Tht)).

In step S1515, the CPU 301 checks the connection state of the wireless LAN communication 800, and determines whether or not the wireless LAN communication 800 with the image forming apparatus 100 has been disconnected. In the case where the CPU 301 determines that the wireless LAN communication 800 has been disconnected, the CPU 301 advances to step S1516. In step S1516, the CPU 301 performs the wireless LAN disconnection process by the wireless LAN module 306. Next, in step S1517, the CPU 301 instructs the timer 308 to stop counting time. In step S1518, the CPU 301 stops the process of the GPS module 1001. In the case where the CPU 301 determines in step S1515 that the wireless LAN communication 800 has not been disconnected, the CPU 301 advances to step S1509, and determines whether or not a user operation is detected.

As described above, according to the fourth embodiment, the image forming apparatus 100 without GPS function can calculate the distance from the mobile terminal 320 and, when the distance reaches the predetermined distance or more, disconnect the wireless LAN communication with the mobile terminal 320.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-060798, filed Mar. 24, 2014, which is hereby incorporated by reference herein in its entirety.

What is claimed is:

1. A communication system comprising a communication apparatus capable of performing direct wireless communication with a plurality of mobile terminals with which the communication apparatus has completed establishing processing for establishing a connection, and the plurality of mobile terminals, wherein
at least one of the mobile terminals comprises:
a first wireless network interface available for direct wireless communication;
a position information obtainment circuit that outputs position information of the mobile terminal; and
at least one first controller that functions as:
a unit that obtains a first output from the position information obtainment circuit in accordance with establishing processing;
a unit that obtains a second output from the position information obtainment circuit after the connection has been established; and
a unit that transmits a disconnection request for disconnecting the connection via the first wireless network interface to the communication apparatus based on the first output and the second output,
the communication apparatus comprises:
a second wireless network interface available for direct wireless communication; and
at least one second controller that functions as:
a unit that obtains, via the second wireless network interface, the disconnection request transmitted from one of the plurality of mobile terminals; and
a unit that disconnects, in accordance with the disconnection request being obtained, the connection with the mobile terminal from which the disconnection request was transmitted, out of the plurality of mobile terminals with which the communication apparatus has established connections.

2. The communication system according to claim 1, wherein
the first controller determines whether or not to request the communication apparatus to disconnect the connection based on the first output and the second output, and transmits, in accordance with the determination to request, the disconnection request via the first wireless network interface to the communication apparatus.

3. The communication system according to claim 1, wherein
the first controller transmits the disconnection request via the first wireless network interface to the communication apparatus based on the first output and the second output satisfying a predetermined relation.

4. The communication system according to claim 1, wherein
the first controller generates distance information based on the first output and the second output, and transmits the disconnection request via the first wireless network interface to the communication apparatus based on the generated distance information indicating a distance greater than a predetermined distance.

5. The communication system according to claim 1, wherein
the first controller obtains the second output from the position information obtainment circuit after an elapse of a predetermined time period from when the connection was established.

6. The communication system according to claim 1, wherein
the mobile terminal further comprises a first wireless communicator,
the communication apparatus further comprises a second wireless communicator, and
the connection is established based on information communicated between the first wireless communicator and the second wireless communicator.

7. The communication system according to claim 1, wherein
the first controller obtains the first output from the position information obtainment circuit in accordance with communication between the first wireless communicator and the second wireless communicator.

8. The communication system according to claim 1, wherein
the first wireless communicator is a first NFC communicator, and
the second wireless communicator is a second NFC communicator.

9. The communication system according to claim 1, wherein
the position information obtainment circuit is a GPS circuit.

10. The communication system according to claim 1, wherein
the direct wireless communication is communication according to Wi-Fi Direct.

11. The communication system according to claim 1, wherein
the communication apparatus further comprises a printer device that prints an image on a sheet, and
the second controller causes the printer device to perform image formation based on print data obtained from the mobile terminal through the direct wireless communication.

12. A mobile terminal that communicates with a communication apparatus capable of performing direct wireless communication with a plurality of mobile terminals with which the communication apparatus has completed establishing processing for establishing a connection, the mobile terminal comprising:

a wireless network interface available for direct wireless communication;
a position information obtainment circuit that outputs position information of the mobile terminal; and
at least one controller that functions as:
a unit that obtains a first output from the position information obtainment circuit in accordance with establishing processing;
a unit that obtains a second output from the position information obtainment circuit after the connection has been established; and
a unit that transmits a disconnection request for disconnecting the connection via the wireless network interface to the communication apparatus based on the output and the second output.

13. A control method of a mobile terminal that communicates with a communication apparatus capable of performing direct wireless communication with a plurality of mobile terminals with which the communication apparatus has completed establishing processing for establishing a connection, and comprises a wireless network interface available for direct wireless communication and a position information obtainment circuit that outputs position information of the mobile terminal, the control method comprising:
obtaining a first output from the position information obtainment circuit in accordance with establishing processing;
obtaining a second output from the position information obtainment circuit after the connection has been established; and
transmitting a disconnection request for disconnecting the connection via the wireless network interface to the communication apparatus based on the first output and the second output.

14. A non-transitory computer-readable storage medium storing a computer program for causing a computer to execute a control method of a mobile terminal that communicates with a communication apparatus capable of performing direct wireless communication with a plurality of mobile terminals with which the communication apparatus has completed establishing processing for establishing a connection, and comprises a wireless network interface available for direct wireless communication and a position information obtainment circuit that outputs position information of the mobile terminal, the control method comprising:
obtaining a first output from the position information obtainment circuit in accordance with establishing processing;
obtaining a second output from the position information obtainment circuit after the connection has been established; and
transmitting a disconnection request for disconnecting the connection via the wireless network interface to the communication apparatus based on the first output and the second output.

* * * * *